(12) United States Patent
Waters et al.

(10) Patent No.: US 12,139,384 B2
(45) Date of Patent: Nov. 12, 2024

(54) STRUCTURAL INTEGRATED SENSOR

(71) Applicant: Hyster-Yale Group, Inc., Fairview, OR (US)

(72) Inventors: Edmund Waters, Troutdale, OR (US); Ryan P. McDermott, Fairview, OR (US); Joseph Brotherton, Portland, OR (US); Nicholas M. Draayer, Portland, OR (US); John Timczyk, Camas, WA (US); Erik Israelsson, Gresham, OR (US); Matthew Karr, Portland, OR (US)

(73) Assignee: Hyster-Yale Materials Handling, Inc., Fairview, OR (US)

( * ) Notice: Subject to any disclaimer, the term of this patent is extended or adjusted under 35 U.S.C. 154(b) by 681 days.

(21) Appl. No.: 17/187,276

(22) Filed: Feb. 26, 2021

(65) Prior Publication Data

US 2022/0274817 A1 Sep. 1, 2022

(51) Int. Cl.
*B66F 9/075* (2006.01)
*G01S 7/481* (2006.01)
*B66F 9/08* (2006.01)

(52) U.S. Cl.
CPC ........ *B66F 9/0755* (2013.01); *B66F 9/07513* (2013.01); *B66F 9/07554* (2013.01); *G01S 7/4813* (2013.01); *B66F 9/08* (2013.01)

(58) Field of Classification Search
CPC .......................... B66F 9/0755; B66F 9/07513; B66F 9/07554; B66F 9/08; G01S 7/4813
See application file for complete search history.

(56) References Cited

U.S. PATENT DOCUMENTS

| | | | | |
|---|---|---|---|---|
| 4,322,107 A | * | 3/1982 | Ishizuka | B60K 1/04 |
| | | | | 280/755 |
| 5,964,640 A | * | 10/1999 | Barton | A63H 30/04 |
| | | | | 446/454 |

(Continued)

FOREIGN PATENT DOCUMENTS

| | | |
|---|---|---|
| DE | 10221298 A1 | 11/2003 |
| EP | 3216749 * | 9/2017 |

(Continued)

OTHER PUBLICATIONS

EPO, Appl. No. 21184667.0, Extended European Search Report (Jan. 7, 2022).

(Continued)

*Primary Examiner* — Gertrude Arthur Jeanglaude
(74) *Attorney, Agent, or Firm* — Laurence & Phillips IP Law

(57) ABSTRACT

Materials-handling vehicles, such as counterbalanced lift trucks, can incorporate a counterweight that includes a frame, a cavity, and a sensor-mounting recess. The counterweight may be configured to provide an unobstructed horizontal line of sight of at least 180 degrees for a sensor, such as an object-detection sensor, that is mounted within the sensor-mounting recess. A lift truck can include a lift assembly comprising a mast and a pair of forks, an operator compartment comprising truck steering and speed controls, a plurality of wheels, an energy source, a counterweight comprising a frame and a sensor-mounting recess, and a sensor.

20 Claims, 23 Drawing Sheets

(56) References Cited

U.S. PATENT DOCUMENTS

| | | | | |
|---|---|---|---|---|
| 7,128,179 | B2 * | 10/2006 | Szymanski | B66F 9/0754 |
| | | | | 180/68.5 |
| 7,467,722 | B2 * | 12/2008 | Ramun | E02F 9/18 |
| | | | | 212/178 |
| 9,802,528 | B2 * | 10/2017 | Adami | B66F 17/003 |
| 2011/0259258 | A1 | 10/2011 | DePiero | |
| 2017/0233231 | A1 * | 8/2017 | Gariepy | G05D 1/0238 |
| | | | | 701/2 |
| 2019/0367341 | A1 * | 12/2019 | Stilwell | B66F 9/0759 |

FOREIGN PATENT DOCUMENTS

| | | | | |
|---|---|---|---|---|
| EP | 3216749 | A1 * | 9/2017 | B66F 9/075 |
| JP | 107252863 | A | 10/1995 | |
| JP | 2006336328 | A | 12/2006 | |

OTHER PUBLICATIONS

Response to Extended European Search Report, EPO Pat. Appl. No. 21184667.0 (Feb. 28, 2023).
Intention to Grant, EPO Pat. Appl. No. 21184667.0 (Apr. 15, 2024).

* cited by examiner

STRUCTURAL INTEGRATED SENSOR

TECHNICAL FIELD

The field of this disclosure relates generally to materials-handling vehicles. More specifically, this disclosure relates to a structurally integrated sensor for a lift truck.

BACKGROUND INFORMATION

Multipurpose materials-handling lift trucks, including forklift trucks, are commonly used in manufacturing, shipping and warehousing facilities to lift and to transport materials. Lift trucks are ideally small and agile, have a small turning radius and compact footprint, and are able to repeatedly lift and/or haul thousands of pounds of materials. One type of such a vehicle is a counterbalanced forklift truck, having a counterweight that balances the weight of a load on the forks.

A counterbalanced lift truck generally includes a number of standard components, such as a lift assembly with an attachment, such as forks, that is used to lift a load, and a counterweight. Lift trucks have an energy source that provides power, and wheels to move the truck. A lift truck can include a roof over the operator compartment, such as an overhead guard. The operator compartment can include a seat for the driver, or it can include an operator's platform designed for truck operation while the driver stands. The operator compartment generally includes steering controls such as a steering wheel or tiller, speed controls such as a foot pedal or tiller-mounted throttle, and braking controls. Sensors may be placed on lift trucks to help drivers navigate and/or detect objects near the truck, including in the path of the truck. For example, sensors can be used to alert an operator that a pedestrian is near the truck.

In the absence of sensors, or with a poorly designed sensor arrangement on a lift truck, sensors may be damaged and/or fail, causing operator productivity to suffer. The driver's ability to focus on the operation and navigation of the truck are relevant to efficient materials transport.

This background description is for the purpose of generally presenting the context of the following disclosure. Unless otherwise indicated herein, the subject matter described in this section is not prior art to the claims in this document and are not admitted to be prior art by inclusion in this section.

OVERVIEW OF DISCLOSURE

One aspect of this disclosure relates to a counterweight used for a lift truck. The counterweight may be designed such that, on its outward facing exterior surface, its peripheral edges resemble a four-sided frame surrounding a cavity. The cavity within the frame may be completely open to allow access to the truck, or the cavity can include vertical and/or horizontal supports that may provide structural reinforcement to the counterweight. The frame of the counterweight can include a sensor-mounting recess to provide a sheltered area for affixing a sensor to the counterweight. The recess may be strategically positioned and configured to provide the sensor, including the sensor's housing, with protection from physical damage by encompassing the housing of the sensor within the outermost contour of the frame while also providing the sensor with a wide horizontal line of sight. The sensor-mounting recess may be located in the lowest peripheral edge of the frame. An additional aspect relates to lift trucks that incorporate a counterweight that provides a beneficial location for mounting a sensor to optimize the sensor's performance. A further aspect relates to providing a driver with advantageous features for productive lift truck operation.

One embodiment is a counterweight for a lift truck, in which the counterweight includes a frame that is formed by a substantially horizontal upper peripheral edge, a first substantially vertical side peripheral edge, a second substantially vertical side peripheral edge opposite the first substantially vertical side peripheral edge, and a lower peripheral edge. The counterweight may also include a cavity surrounded by the frame, as well as a sensor-mounting recess. The sensor-mounting recess may be positioned in the lower peripheral edge of the frame. The sensor-mounting recess may be configured to provide an unobstructed horizontal line of sight of at least about 180 degrees for a sensor when the sensor is mounted within the sensor-mounting recess.

Another embodiment is a lift truck having a counterweight, in which the lift truck includes a lift assembly having a mast and at least two forks, an operator compartment comprising truck steering and speed controls, a plurality of wheels, an energy source, a counterweight including a frame and a sensor-mounting recess, and a sensor. The lift assembly and the counterweight may be positioned at opposite ends of the lift truck, such as at the front and rear ends, respectively. The sensor may be positioned within the sensor-mounting recess and have an unobstructed horizontal line of sight of at least about 180 degrees. The frame of the counterweight can include an upper peripheral edge, two substantially vertical side peripheral edges, and a lower peripheral edge opposite the upper peripheral edge. The frame may be configured to retain the sensor within the sensor-mounting recess such that a housing of the sensor is contained within the outermost contour of the counterweight.

Another embodiment is a method including the steps of attaching a counterweight to one end of a materials-handling truck body, wherein the counterweight includes a sensor-mounting recess and a harness-routing pathway; attaching a sensor in the sensor-mounting recess, wherein the sensor is connectable to a wiring harness; and routing the wiring harness through the harness-routing pathway of the counterweight. The sensor may be attached in the sensor-mounting recess such that the sensor has an unobstructed horizontal line of sight of at least about 180 degrees.

In some additional, alternative, or selectively cumulative embodiments, the sensor mounted in a sensor-mounting recess includes an object-detection sensor.

In some additional, alternative, or selectively cumulative embodiments, the lower peripheral edge of the frame of a counterweight includes a tow-pin hole.

In some additional, alternative, or selectively cumulative embodiments, the lower peripheral edge of the frame of a counterweight includes a harness-routing pathway.

In some additional, alternative, or selectively cumulative embodiments, the lower peripheral edge of the frame of a counterweight includes a tow pin.

In some additional, alternative, or selectively cumulative embodiments, the lower peripheral edge of the frame of a counterweight has a length between about 20 inches and about 120 inches.

In some additional, alternative, or selectively cumulative embodiments, the sensor-mounting recess of a counterweight has a height between about 2 inches and about 6 inches.

In some additional, alternative, or selectively cumulative embodiments, the sensor-mounting recess of a counterweight has a depth between about 2 inches and about 6 inches.

In some additional, alternative, or selectively cumulative embodiments, the ratio of the height of the upper peripheral edge of the frame of a counterweight to the height of the lower peripheral edge of the frame is between about 1:1 and about 1:5.

In some additional, alternative, or selectively cumulative embodiments, the ratio of the height of the upper peripheral edge of the frame of a counterweight to the height of the lower peripheral edge of the frame is less than 1.

In some additional, alternative, or selectively cumulative embodiments, a counterweight has a mass between about 500 kg and about 2,500 kg.

In some additional, alternative, or selectively cumulative embodiments, the energy source of the lift truck having a counterweight includes an exhaust tube having an end that releases exhaust, the exhaust tube end being positioned external of the sensor-mounting recess.

In some additional, alternative, or selectively cumulative embodiments, the lift truck having a counterweight has a lift capacity between about 1 ton and about 4 tons.

In some additional, alternative, or selectively cumulative embodiments, the lift truck having a counterweight includes a sensor that is an object-detection sensor.

In some additional, alternative, or selectively cumulative embodiments, the lift truck having a counterweight includes an object-detection sensor that is a lidar sensor.

In some additional, alternative, or selectively cumulative embodiments, the lift truck having a counterweight provides an unobstructed horizontal line of sight for a sensor, when the sensor is positioned between about 20 inches and about 30 inches above floor level and when the lift truck is positioned on a substantially flat floor.

In some additional, alternative, or selectively cumulative embodiments, a method of assembling a lift truck includes attaching a bracket to the sensor and securing the bracket in the sensor-mounting recess.

In some additional, alternative, or selectively cumulative embodiments, a method of assembling a lift truck having a counterweight includes the counterweight including a cavity having a tow-pin hole therein, wherein the method further includes inserting a tow pin in the tow-pin hole.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the accompanying drawings.

DETAILED DESCRIPTION OF EMBODIMENTS

Figure 1:
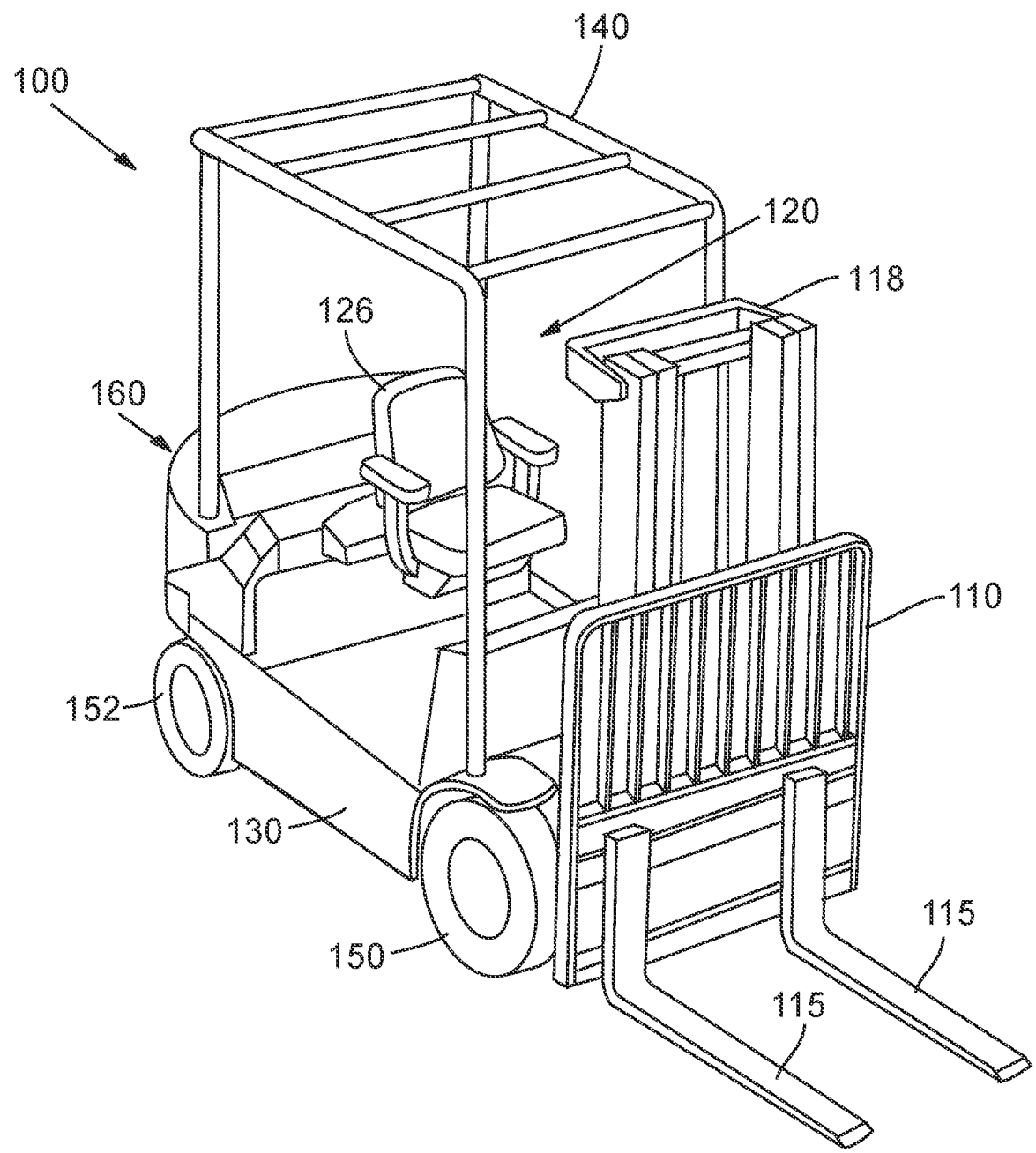
FIG. 1 is an isometric drawing of a lift truck having a counterweight from a front right perspective, according one embodiment.

Example embodiments are described below with reference to the accompanying drawings. Unless otherwise expressly stated, the sizes, positions, etc., of components, features, elements, etc., as well as any distances therebetween, are not necessarily to scale, and may be disproportionate and/or exaggerated for clarity. The accompanying drawings form a part of the disclosure hereof wherein like numerals designate like parts throughout, and in which is shown by way of illustration embodiments that may be practiced. Thus, the same or similar numbers may be described with reference to other drawings even if they are neither mentioned nor described in the corresponding drawing. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, are open-ended and specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," "approximately," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In certain embodiments, the terms "about," "substantially," and "approximately," refer to values that are, for example, within 1% of the stated value, within 2% of the stated value, within 3% of the stated value, within 4% of the stated value, within 5% of the stated value, within 6% of the stated value, within 7% of the stated value, within 8% of the stated value, within 9% of the stated value, or within 10% of the stated value.

Spatially relative terms, such as "right," left," "front," "rear," "below," "beneath," "lower," "above," and "upper," and the like, may be used herein for ease of description to describe one element's or feature's relationship to another element or feature, as illustrated in the drawings. It should be recognized that spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

For the purposes of the present disclosure, the phrase "A and/or B" means (A), (B), or (A and B). For the purposes of the present disclosure, the phrase "combination of (A) and (B)" means (A), (B), or (A and B). For the purposes of the present disclosure, the phrase "A, B, and/or C" means (A), (B), (C), (A and B), (A and C), (B and C), or (A, B and C).

The embodiments described herein are merely examples, set forth by way of illustration only and not limitation. The description may use the phrases "in an embodiment" or "in embodiments," which may each refer to one or more of the same or different embodiments. Unless indicated otherwise, elements or operations of one embodiment may be used with other embodiments. Unless clearly indicated otherwise, all connections and all operative connections may be direct or indirect.

A counterweight ideally provides a counterbalanced lift truck with a low, stable mass opposite a load to improve truck stability. Having any material removed from the counterweight mass, particularly in a location that is low to the ground such as a sensor-mounting recess, is generally unfavorable and counterintuitive. Additionally, it may be technically difficult to design a cast counterbalance with pathways for cables and/or wires, including those that transmit power and/or data.

It is desirable to design a component, for example a counterweight, for a lift truck such that the component additionally provides a protected area for placing a sensor. If the component is a counterweight, this can be achieved by incorporating an indentation into the counterweight, such as a recess that is sized and positioned to maximize the sensor's capabilities when mounted, while also able to protect the sensor from physical damage when the truck is being operated. An aspect of a counterweight having a useful sensor-mounting recess can be achieved by ensuring that the recess is suitably configured to optimize use of the sensor during truck operation, such as providing the sensor with a large and unobstructed field of view. In addition, it is beneficial for the sensor-mounting recess to have ready access to an energy source to power the sensor, as well as to provide a suitable environment for optimum sensor performance, such as to limit exposure to unfavorable temperatures or gases.

As one skilled in the art will appreciate in light of this disclosure, certain embodiments of the counterweights and lift trucks, and designs therefor that are disclosed herein, may be capable of achieving certain advantages, including, in some cases, one or more of the following: (1) a sensor-mounting recess having multiple design features to facilitate optimum performance of a sensor, such as an unobstructed wide field of view; (2) a sensor-mounting recess having multiple design features to facilitate protection of a sensor from physical damage; (3) preserved and/or enhanced structural integrity of a counterweight including a cavity, a sensor-mounting recess, or a combination of a cavity and a sensor-mounting recess; (4) a counterweight designed to permit ready access of a sensor to a power source internal the vehicle; (5) a counterweight designed to vent a vehicle's energy source to a location external the truck body to ensure sensor performance is not compromised; and (6) a vehicle having multiple design features to facilitate efficient performance of an operator driving the vehicle. The foregoing and other advantages of various embodiments will be apparent upon reading this document.

Figure 2:
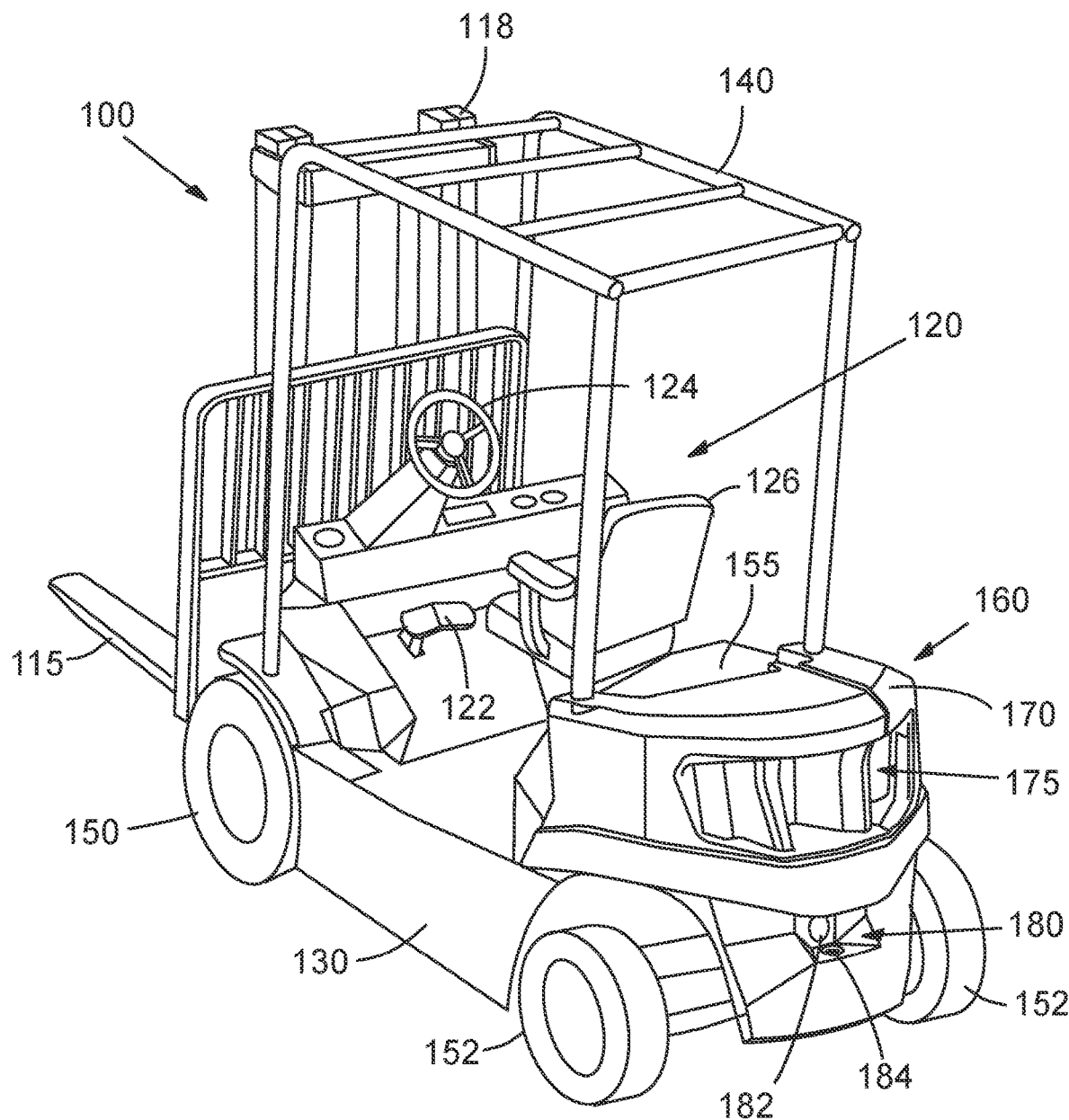
FIG. 2 is an isometric drawing of the lift truck of FIG. 1, from a rear left perspective.

FIGS. 1 and 2 are isometric illustrations of a lift truck 100 according to one embodiment, showing the front and rear of the vehicle, respectively. Referring to FIG. 1, the lift truck 100 has a lift assembly 110 including two forks 115 and a mast 118, an operator compartment 120 including a seat 126, a truck body 130, an overhead guard 140, front wheels 150, rear wheels 152, and a counterweight 160. FIG. 2 additionally shows the operator compartment 120 having a foot pedal 122 and a steering wheel 124, a panel 155 behind the seat 126, and the counterweight 160 having a frame 170, a cavity 175, a sensor-mounting recess 180, a harness-routing pathway 182, and a tow-pin hole 184.

The lift assembly 110 is used to lift a load and is attached to the truck body 130. For example, the mast 118 can support a fork carriage having at least one fork 115 attached thereto. The fork carriage can be raised to different heights by movement of the mast 118. The lift assembly 110 is configured to vertically lift a load on the forks using, for example, a hydraulic system. A lift assembly may also include paper roll clamps, carton clamps, multiple-forks assemblies, side-shifters, a container handler or spreader attachment, and other suitable attachments. In an embodiment, the lift assembly 110 includes a reach assembly, such as a pantograph-type reach assembly. In an embodiment, the lift truck 100 includes a tilt mechanism, connected to the lift assembly 110, to tilt the top of the mast 118 back slightly, and therefore the ends of the forks 115 up slightly, to more stably carry a load. A sensor may be incorporated within, or attached to, the lift assembly 110.

The operator compartment 120 shown in FIGS. 1 and 2 contains a foot pedal 122, a steering wheel 124, and a seat 126, as well as an overhead guard 140 that extends at the top of and over the operator compartment 120. Embodiments of materials-handling vehicles disclosed herein may include none, some, or all of these components. For example, the lift truck 100 may have a steering control that is a steering tiller or joystick rather than a wheel 124, or the steering controls may be integrated into the seat 126, such as part of an armrest. Manual levers attached to the cowl of the lift truck 100 may be used for controlling the mast, and may be present in the operator compartment 120. Vehicle speed and/or braking controls may include one or more of a foot pedal 122, such as an accelerator pedal, a brake pedal, and/or an inching pedal. Alternatively, the operator compartment 120 may be free of foot controls, and vehicle speed and braking controls may be integrated into the seat 126 and/or into a hand throttle on a steering tiller. The operator compartment 120 may include a seat 126, or it may be configured such that the driver operates the truck while standing and contain a lean bar or lean pad instead of a seat 126. In an embodiment, a sensor may be incorporated within, or attached to, the operator compartment 120.

As shown in FIGS. 1 and 2, the truck body 130 does not include doors for the operator compartment 120. In an embodiment, there are one or more doors attached to truck body 130 for egress into and out of the operator compartment 120. In an embodiment, a sensor may be incorporated within, or attached to, the truck body 130. The truck body 130 may include one or more steps for an operator to use to access the operator compartment 120. The truck body 130 may be designed with or configured to include a low platform such that the operator stands while driving the lift truck 100 rather than sits.

The lift truck 100 can include an overhead guard 140 that is positioned partially or completely over the operator compartment 120 and that may form a roof or cover for the operator compartment 120. In an embodiment, the overhead guard 140 is solid and opaque, for example, to act as a sun shade to protect the operator from sunlight when the truck is used outside. Alternatively, the overhead guard 140 is transparent or semi-transparent in whole or in part and/or has one or more apertures to enable the operator to view the forks 115, top of the mast 118, and/or its load when the mast 118 is raised. In an embodiment, a tilt mechanism can be incorporated within, or attached to, the overhead guard. In another embodiment, the overhead guard 140 comprises a sheet of plexiglass over substantially the entire roof area of the overhead guard 140 so as to maximize overhead visibility for the operator. In certain embodiments, a sensor may be incorporated within, or attached to, the overhead guard 140.

As indicated in FIGS. 1 and 2, lift truck 100 has two front wheels 150 and two rear wheels 152. The truck steering control, such as steering wheel 124, may be configured to turn one or more of the rear wheels 152 when the lift truck 100 moves forward or backward. The wheels 150 and 152 are directly or indirectly attached to the body 130 of the truck 100 and are configured to roll to steerably move the truck 100 forward and backward. In an embodiment, the materials-handling vehicle includes a plurality of wheels. For example, a lift truck may have three wheels, or it may have four wheels, or it may have more than four wheels. All or a subset of the plurality of wheels may be steerable. Two of the wheels 150 or 152 of the lift truck 100, as depicted in FIGS. 1 and 2, can independently be replaced with a single wheel to form a lift truck having three wheels. For example, the two rear wheels 152 shown in FIG. 2 may be replaced with a single rear wheel. Additional front or rear wheels can independently be added to the lift truck 100 to form a truck having more than four wheels.

In an embodiment, the lift truck 100 has a plurality of wheels that comprises at least one left wheel and at least one right wheel. In an embodiment, the lift truck 100 has a plurality of wheels that comprises two front wheels and one rear wheel. All or a subset of the wheels may be solid, or all or a subset of the wheels may be pneumatic, or the plurality of wheels may include a mixture of solid and pneumatic wheels.

In reference to FIG. 2, the truck 100 has a panel 155 that is located behind the operator's seat 126. The panel 155 may be a cover to a compartment that lies partially or completely behind counterweight 160, such as between counterweight 160 and seat 126. The compartment may contain, for example, an energy source for the truck 100, power electronics and/or other truck parts.

Figure 3A:
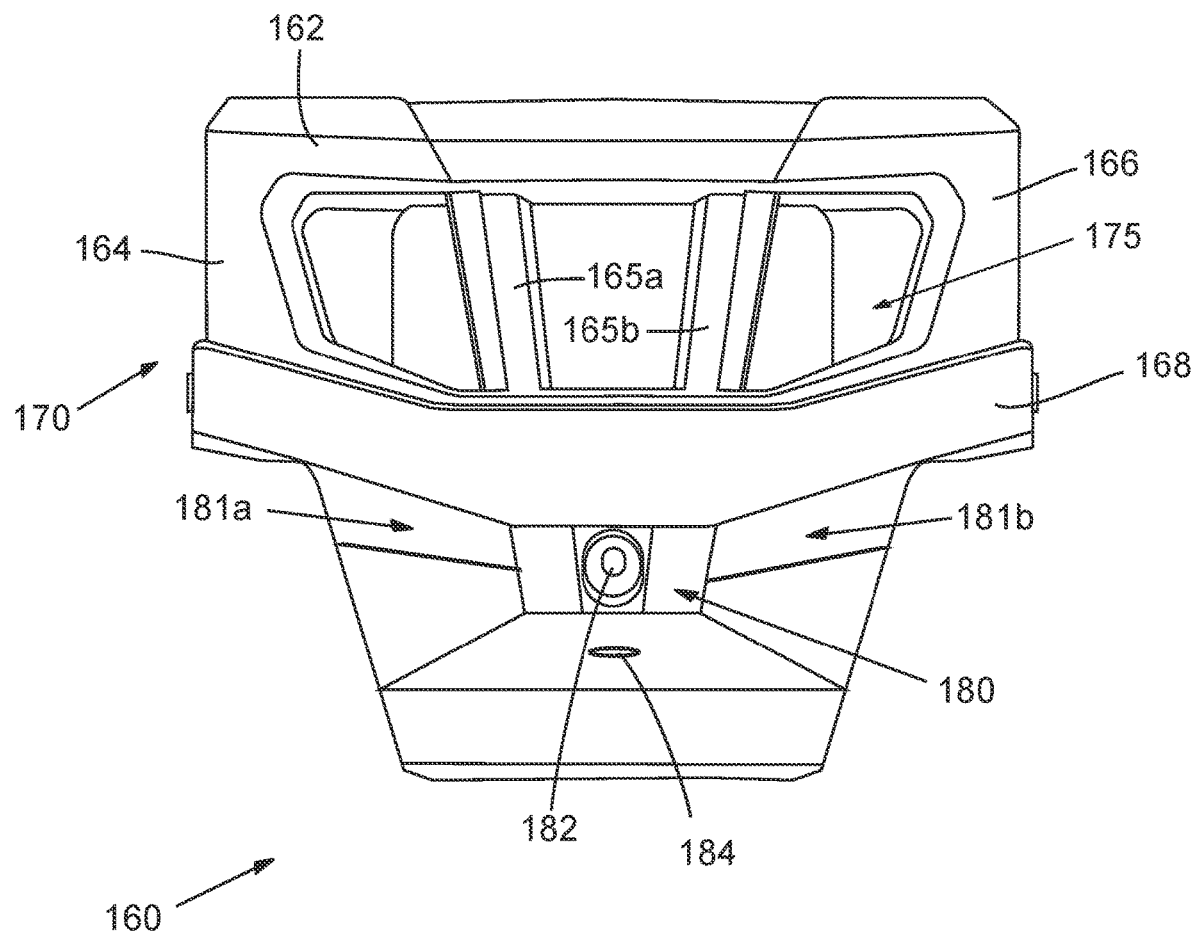
FIGS. 3A and 3B are drawings of an embodiment of a counterweight from the front.
Figure 3B:
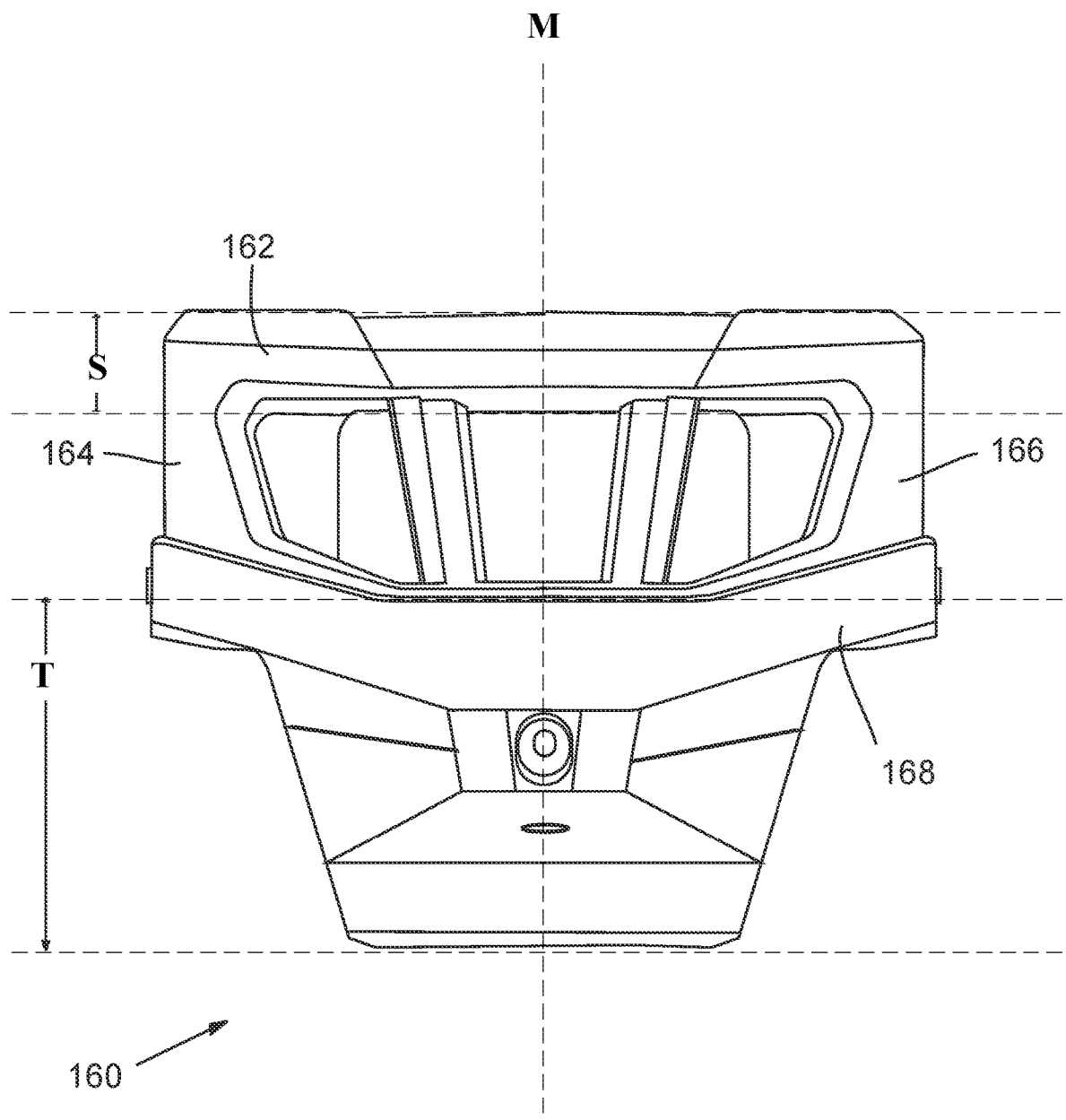
Figure 4:
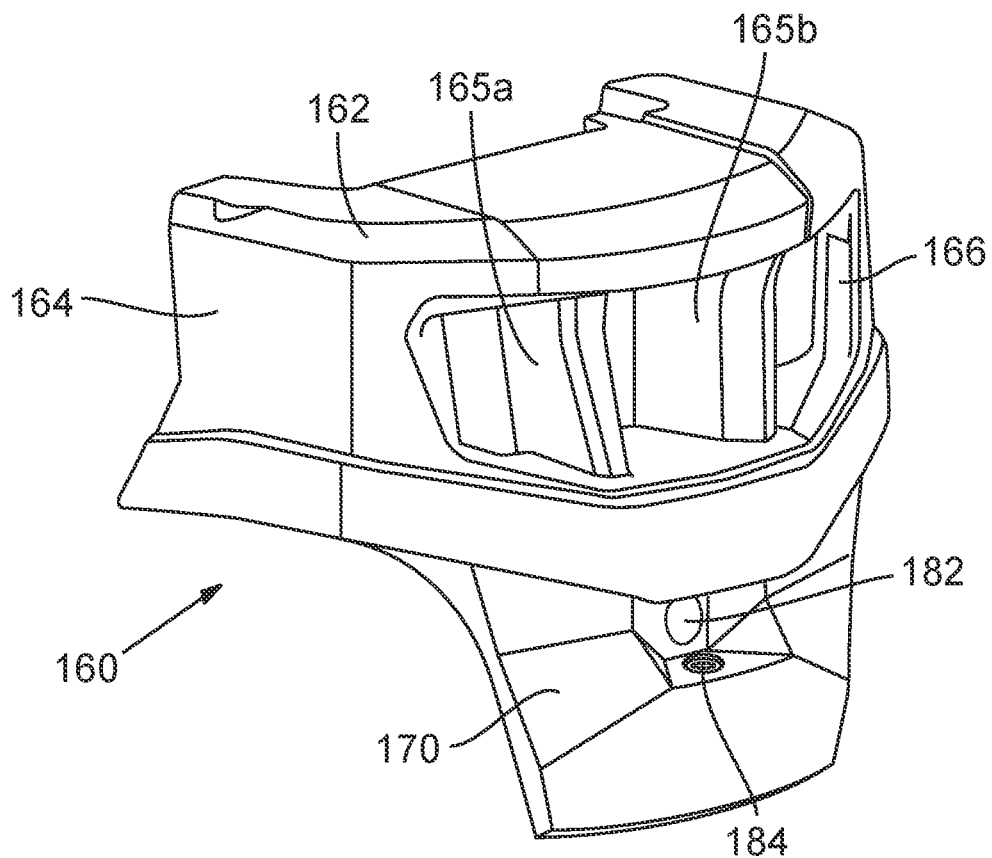
FIG. 4 is an isometric drawing of the counterweight of FIG. 3, from a front right perspective.
Figure 5:
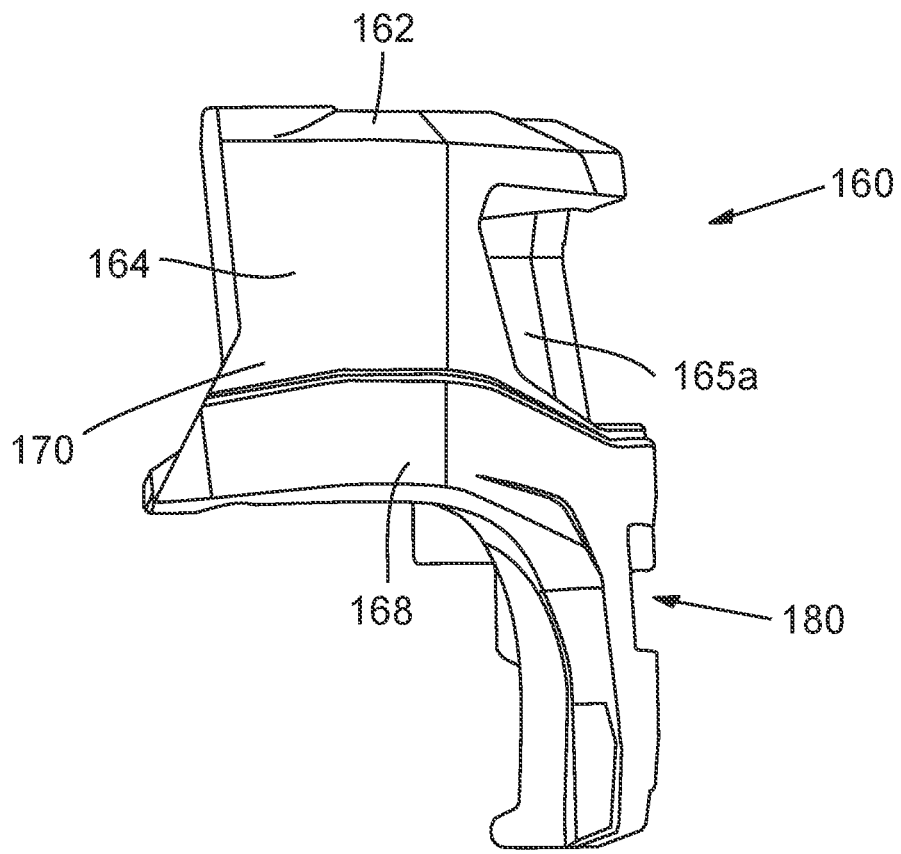
FIG. 5 is a drawing of the counterweight of FIG. 3, from the right side.

FIGS. 3A, 3B, 4, and 5 are illustrations of an exemplary counterweight 160. FIGS. 3A and 3B show an embodiment of the counterweight 160 from the front, FIG. 4 shows the counterweight 160 of FIGS. 3A and 3B from a front right perspective, and FIG. 5 is a right side view of the counterweight 160 of FIGS. 3A and 3B. The counterweight 160 includes a frame 170 having substantially horizontal upper peripheral edge 162 that extends longitudinally between two substantially vertical side peripheral edges 164 and 166. The substantially vertical side peripheral edges 164 and 166 are opposite and approximately parallel to each other. A lower peripheral edge 168 also extends longitudinally between the side edges 164 and 166 to complete the frame 170. The substantially horizontal upper edge 162 and lower peripheral edge 168 are opposite and approximately parallel to each other. The peripheral edges 162, 164, 166, and 168 form a frame 170 that surrounds cavity 175. The edges of the frame 170 may be curved such that, for example, the vertical edges 164 and 166 wrap around the end of the truck 100 to extend partially along the sides of the truck 100, such as is depicted in FIG. 2. In an embodiment, the lower peripheral edge 168 of frame 170 curves under the bottom of the truck 100 to extend partially along the underside of the truck 100, such as is depicted in FIG. 5.

In an embodiment, the frame 170 is approximately rectangular in shape, with the side edges 164 and 166 having approximately equal lengths, and upper and lower edges 162 and 168 having approximately equal lengths that are longer than, and substantially perpendicular to, the side edges 164 and 166. In an embodiment, the frame 170 may be approximately square in shape, where each of the peripheral edges 162, 164, 166, and 168 have approximately equal lengths. The counterweight 160 may include one or more generally lateral (that is, vertical with respect to the truck 100, and spanning the width of the cavity 175) and/or longitudinal (that is, horizontal and spanning the length of the cavity 175) frame reinforcements 165 that extend across edges of the frame 170. For example, the counterweight 160 shown in FIGS. 3-5 includes two lateral frame reinforcements 165a and 165b, and a counterweight 260 shown in FIG. 12 has two lateral frame reinforcements 265a and 265b as well as two longitudinal frame reinforcements 265c and 265d. In an embodiment, there are no lateral or longitudinal frame reinforcements spanning the cavity 175 of the counterweight frame 170.

The length of the upper and lower peripheral edges 162 and 168 may independently be between about 10 and about 130 inches, such as between about 20 and about 120 inches, between about 30 and about 60 inches, or between about 35 and about 50 inches. The length of the side peripheral edges 164 and 166 may independently be between about 12 and about 48 inches, such as between about 16 and about 36 inches, or between about 18 and 30 inches.

The height of the upper and lower peripheral edges 162 and 168, respectively, may be the same or they may be different. Referring to FIG. 3B, the height of the upper peripheral edge 162 is defined as height S and that of the lower peripheral edge is defined as height T, as measured at the approximate vertical midpoint M of the counterweight 160 when viewed from the front (that is, in the two-dimensional plane defined by the four edges of the frame 170). Notably, the height T includes the height of the sensor-mounting recess 180. In an embodiment, the height T of the lower peripheral edge 168 is between about 12 inches and about 36 inches, such as between about 18 inches and about 30 inches, between about 20 inches and about 24 inches, or it is about 23 inches. The height S of the upper peripheral edge 162 may be between about 2 inches and about 24 inches, such as between about 4 and 20 inches, between about 5 and 10 inches, or between about 6 and 9 inches.

In certain embodiments, the height S of the upper peripheral edge 162 is shorter than the height T of the lower peripheral edge 168. The ratio of the height S of the upper peripheral edge 162 to the height T of the lower peripheral edge 168 may be between about 1:1 and 1:5, such as between about 1:2 and 1:4. In an embodiment, the ratio of the height S of the upper peripheral edge 162 to the height T of the lower peripheral edge 168 may be less than 1. In a further embodiment, the ratio of the height S of the upper peripheral edge 162 to the height T of the lower peripheral edge 168 may be approximately 1.

The counterweight 160 may be made of one or more pieces, with each piece having one or more mechanical properties such as tensile strength. A counterweight that is formed from, or made with, multiple counterweight pieces may in some circumstances be considered to be one functional unit that may be referred to herein as simply a "counterweight." Thus, the term "counterweight" may mean a single-piece counterweight or a functional unit comprising multiple counterweight pieces, depending on context. Optionally, a lift truck 100 may contain one or more counterweights 160. For example, the counterweight 160 may be a two-piece counterweight comprising multiple Gray Iron casting grades. In an embodiment, the counterweight 160 is a single piece of cast iron. The counterweight 160 may be made of steel, and may optionally include lead as a filler. In an embodiment, the counterweight 160 comprises steel and lead. In an embodiment, the counterweight 160 comprises one or more of steel, iron, and lead. In an embodiment, the counterweight 160 consists of one or more of steel, iron, and lead. In an embodiment, the counterweight 160 comprises cast steel.

The counterweight 160 may be attached to the opposite end of the truck 100 as the lift assembly 110; that is, it may be attached to the rear end of the truck 100 shown in FIGS. 1 and 2. In an embodiment of a lift truck having the forks in the rear of the truck, the counterweight 160 may be attached to the front end of the lift truck. The counterweight can be made with one or more cast pieces, and different form factors can accommodate different shapes and/or arrangements of the lift truck components. For example, a lift truck having a hydrogen-based energy source may, for example, incorporate a counterweight that is formed with a tall edge in order to help protect the hydrogen tanks. Similarly, a lift truck having a lithium ion battery bank or combustion engine may incorporate a counterweight that is designed to have a shelf or enclosure within it, such as a compartment covered by panel 155 as depicted in FIG. 2.

In an embodiment, the counterweight 160 has a mass between about 100 kg and about 5,000 kg, such as, for example, between about 300 kg and about 3,000 kg, between about 500 kg and about 2,500 kg, or between about 600 kg and about 2,200 kg. In an embodiment, the counterweight 160 has a mass greater than about 100 kg, greater than about 300 kg, greater than about 600 kg, greater than about 800 kg, or greater than about 1,000 kg. In certain embodiments, the counterweight 160 has a mass at least about 100 kg, at least about 300 kg, at least about 600 kg, at least about 800 kg, at least about 1,000 kg, at least about 1,800 kg, or at least about 2,100 kg.

With reference to FIGS. 3A, 3B, and 4, the sensor-mounting recess 180 may include a tow-pin hole 184 near the bottom of the recess 180. The tow-pin hole 184, if present, may lie directly in front of, or coaxially with, a harness-routing pathway 182, or it may be offset from the central axis of the harness-routing pathway 182. A tow-pin hole and/or tow pin may be used, for example, to conveniently attach trailers behind the truck, or to which a tow rope or chain may be attached. In an embodiment, the sensor-mounting recess 180 does not include a tow-pin hole 184. The tow-pin hole 184 may be configured to snugly retain a tow pin that is, for example, a cylindrical metal bar having a diameter of about 1 inch. In an embodiment, the sensor-mounting recess 180 includes one or more tow-pin holes 184.

The lower peripheral edge 168 of the counterweight 160 includes a sensor-mounting recess 180 having a harness-routing pathway 182. The recess 180 and the pathway 182 are located in the lower peripheral edge 168, which, in an embodiment, extends laterally toward the bottom of the lift truck 100. The recess 180 is indented toward the body of the truck 100 with respect to the exterior surface of the counterweight 160 and is designed to encompass a sensor, partially or entirely, within the area defined by the outermost contour of the lower peripheral edge 168. That is, a sensor may be tucked into the volume defined by the recess 180 as if the outermost surface of the counterweight formed a continuous surface and the recess 180 was not present. Such a design can protect a sensor that is mounted within the recess 180 from being physically damaged if, for example, the lift truck hits or brushes against a surface such as a wall or pillar, because the sensor is recessed into the counterweight 160.

Figure 6:
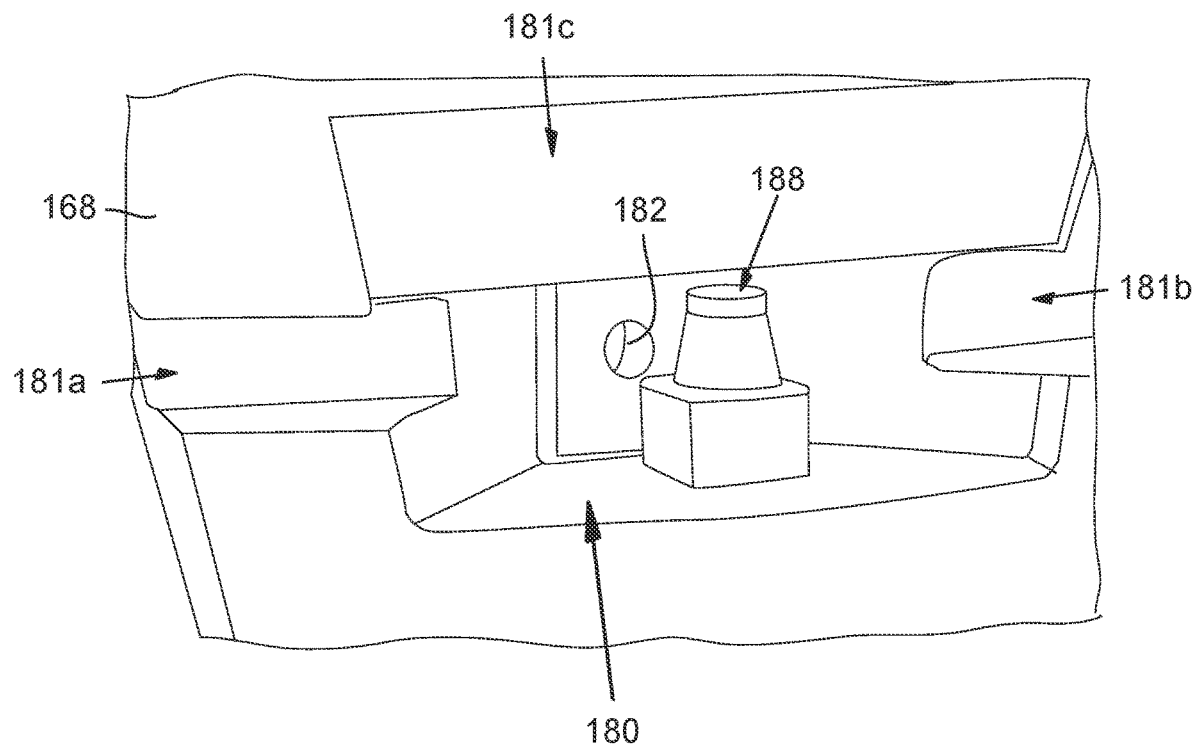
FIG. 6 is a drawing of an embodiment of a counterweight having a sensor-mounting recess with a sensor, from a front right perspective.
Figure 7:
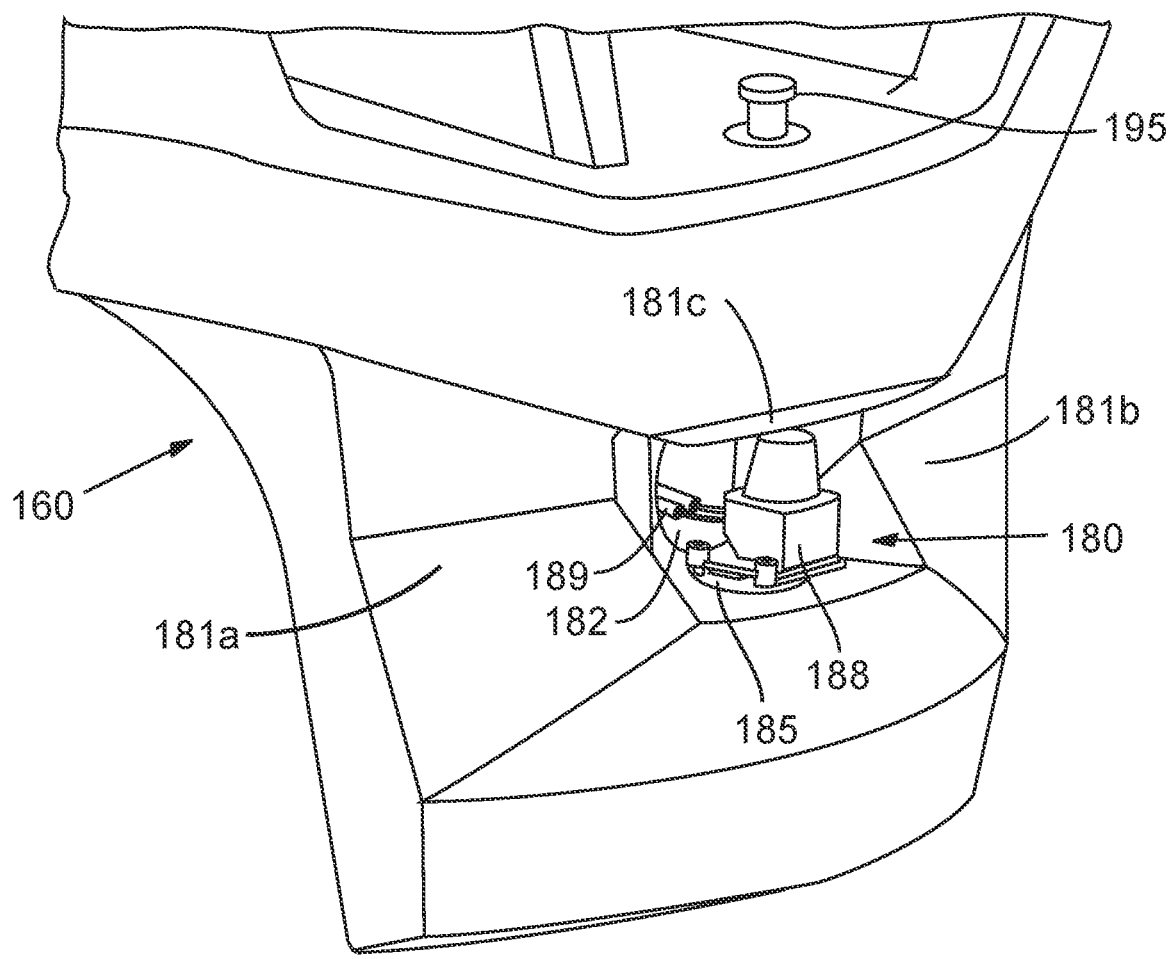
FIG. 7 is a drawing of an additional embodiment of a counterweight having a sensor-mounting recess with a sensor, from a front right perspective.

FIGS. 6 and 7 show a sensor 188 mounted in two differently configured embodiments of the lower peripheral edge 168 of a counterweight 160. As used herein, when referring to the physical footprint or volume of the sensor, unless otherwise indicated, the term "sensor" includes the physical housing of the sensor as well as any detection/imaging components thereof. In an embodiment, a sensor 188 does not substantially extend beyond the outermost contour of the counterweight 160 when the sensor is located in the sensor-mounting recess 180 and is contained within the outermost contour of the counterweight 160. The design of the lower peripheral edge 168 that is adjacent to the sensor-mounting recess 180 may be configured to provide optimum sensor performance when a sensor is mounted in the recess 180. In an embodiment, the portion of the lower peripheral edge 168 that is to the right and left sides of, and adjacent to, the harness-routing pathway 182, shown in FIGS. 3, 6, and 7 as 181a and 181b, may be indented with respect to the exterior surface of the counterweight 160. The indentation of portions 181a and 181b may be identical, or they may be different. In an embodiment of the counterweight 160, the portion of the lower peripheral edge 168 that is above and adjacent to the harness-routing pathway 182, shown in FIGS. 6 and 7 as 181c, may be indented with respect to the exterior surface of the counterweight 160.

FIG. 6 illustrates an embodiment of a counterweight 160 having a lower peripheral edge 168 that includes a wide longitudinal indentation of 181a and 181b to provide a larger unobstructed window for the sensor's horizontal line of sight, as compared to the indentation design of the lower peripheral edge 168 illustrated in FIG. 7.

With reference to FIG. 7, an embodiment of the counterweight 160 may include a tow pin 195 that is external the sensor-mounting recess 180. For example, the lower peripheral edge 168 of the counterweight 160 may include a tow pin 195 extending into the cavity 175 of the frame 170. In an embodiment, the counterweight 160 includes a tow pin 195.

Figure 8:
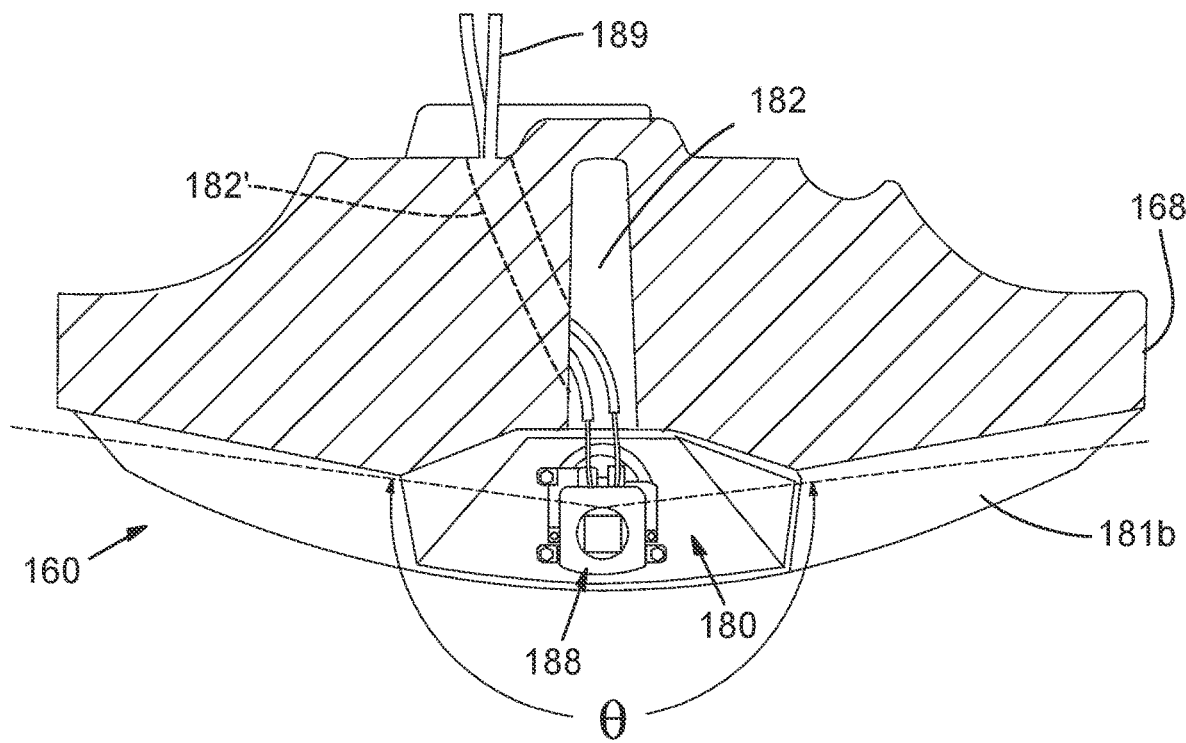
FIG. 8 is a cross-sectional top view of a counterweight having a sensor-mounting recess with a sensor, according to one embodiment.

FIG. 8 is a top cross-sectional view of an embodiment of a counterweight 160, with the counterweight 160 cut at approximately the midpoint of the height of the sensor recess 180. The configuration of the lower peripheral edge 168 may be such that a sensor 188 mounted in sensor-mounting recess 180 has an unobstructed horizontal line of sight having an angle theta (θ). The angle theta (θ) may be at least about 180 degrees. A sensor 188 mounted in the sensor-mounting recess 180 may have an unobstructed horizontal line of sight having an angle theta (θ) of, for example, about 75 degrees, about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, about 160 degrees, about 165 degrees, about 170 degrees, about 175 degrees, about 180 degrees, about 185 degrees, about 190 degrees, about 195 degrees, about 200 degrees, about 205 degrees, about 210 degrees, about 215 degrees, about 220 degrees, about 225 degrees, about 230 degrees, about 235 degrees, about 240 degrees, about 245 degrees, about 250 degrees, about 255 degrees, about 260 degrees, about 265 degrees, about 270 degrees, about 275 degrees, or about 280 degrees. The sensor 188 mounted in the sensor-mounting recess 180 may have an unobstructed horizontal line of sight having an angle theta (θ) of, for example, between about 15 and about 345 degrees, between about 80 and about 280 degrees, between about 90 and about 270 degrees, between about 120 and about 240 degrees, between about 150 and about 210 degrees, between about 180 and about 200 degrees, or between about 185 and about 195 degrees. In an embodiment, the sensor 188 mounted in sensor-mounting recess 180 has an unobstructed horizontal line of sight having an angle theta (θ) of, for example, at least about 150 degrees, at least about 160 degrees, at least about 170 degrees, at least about 180 degrees, at least about 190 degrees, or at least about 200 degrees.

The sensor 188 may be any type of sensor useful for a materials-handling vehicle. For example, the sensor 188 can be a sensor for detecting objects, including cameras or other imagers. For example, the sensor 188 may use light for detection, including any type of visible, infrared, or ultraviolet light, such as a laser. The sensor 188 may use sound for detection (such as ultrasonic or sonar), electromagnetic radiation other than light, including x-rays, microwaves, or radio waves for detection (such as RFID detectors), or the sensor 188 may be a standard camera, microscopic, fluorescent, telescopic, or photoelectric imager. The sensor 188 may be a scanning sensor or a flash sensor, and it may be a 2-D or 3-D sensor. The sensor 188 may include phased array technology. The sensor 188 may use multiple detection methods, such as to combine an infrared camera image with scanning lidar to identify multiple objects. In an embodiment, the sensor 188 is a lidar sensor. In an embodiment, the sensor 188 comprises a lidar sensor. In an embodiment, the sensor 188 includes lidar.

With reference to FIG. 8, the harness-routing pathway 182 may have a cylindrical shape that extends through a portion of the depth of the counterweight 160. In an embodiment, the harness-routing pathway 182 has a cylindrical shape that extends entirely through the depth of the counterweight 160. As shown in FIG. 8, the counterweight 160 may include one or more branching pathways 182' that extend from a central harness-routing pathway 182. The sensor 188 may have a harness including wires 189 that may be routed through the harness-routing pathway 182 and/or any branches 182' thereof. The wires 189 may be, for example, routed to an energy source and/or a processor located in an engine compartment under the panel 155 of FIG. 2 or elsewhere.

Figure 9:
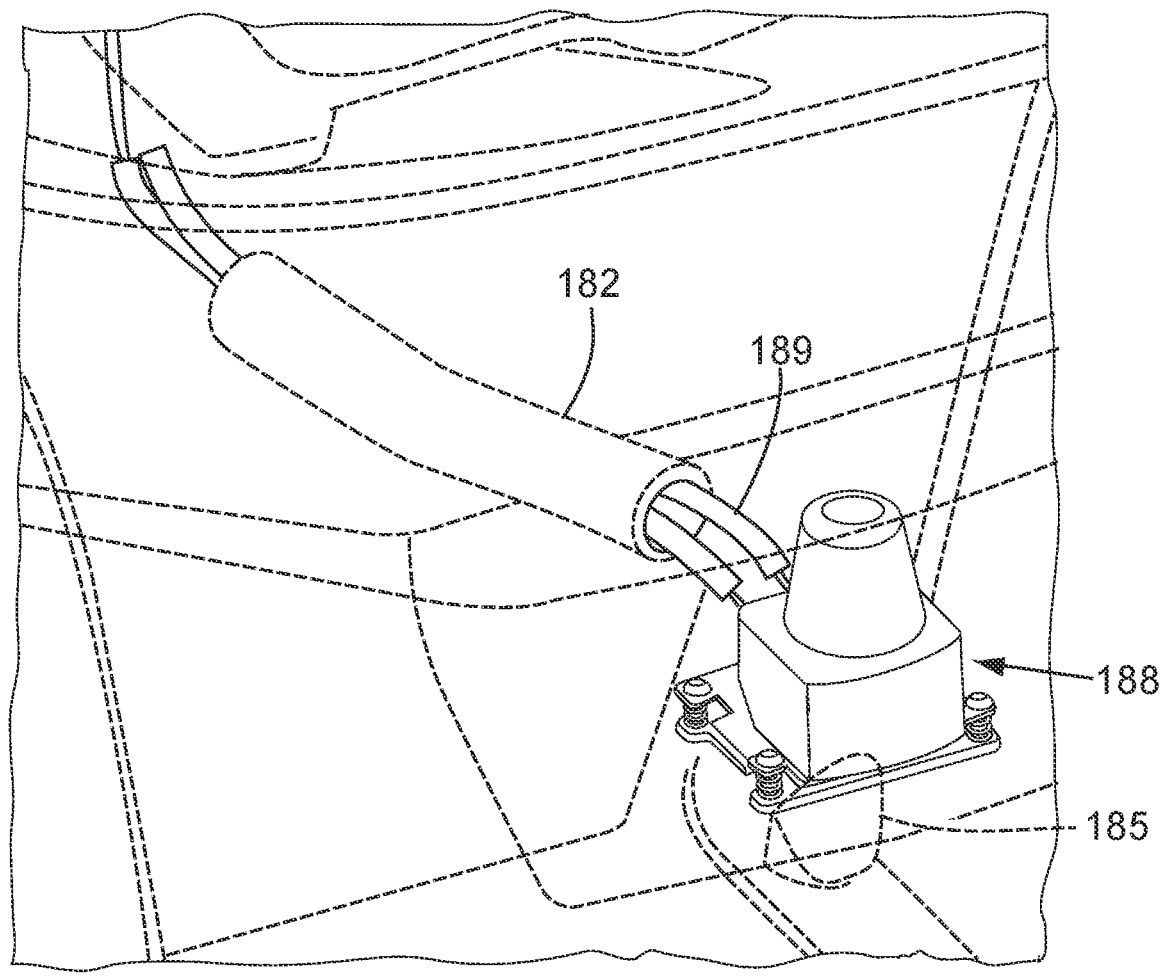
FIG. 9 is a partially transparent illustration of an embodiment of a counterweight having a sensor-mounting recess with a sensor, from a front right perspective.

FIG. 9 is a partially transparent illustration of an embodiment of a counterweight from a front right perspective, showing a harness-routing pathway 182 with wires 189 of a sensor 188 routed through it. The sensor-mounting recess 180 illustrated in FIG. 9 includes a sensor 188 mounted into the recess 180 using a bracket 185 placed into a tow-pin hole 184.

Figure 10:
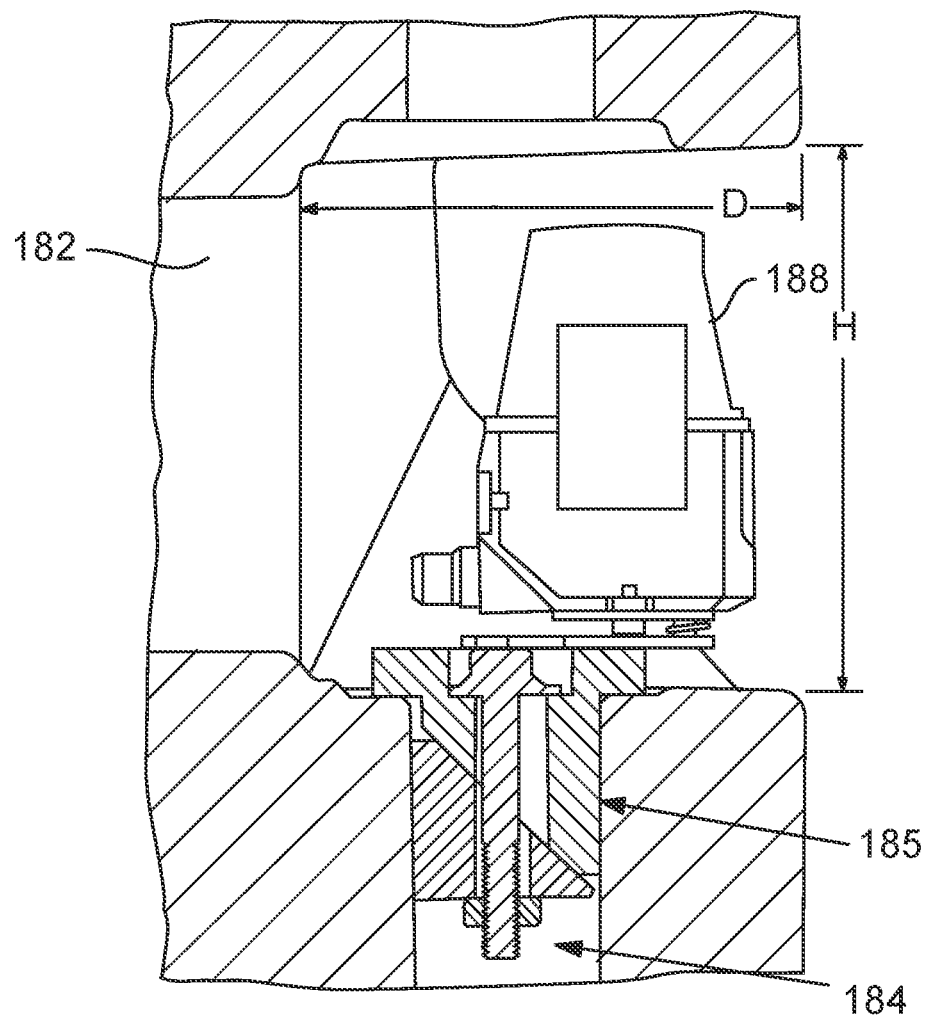
FIG. 10 is a drawing of an embodiment of a counterweight having a sensor-mounting recess with a sensor, from the side.
Figure 11:
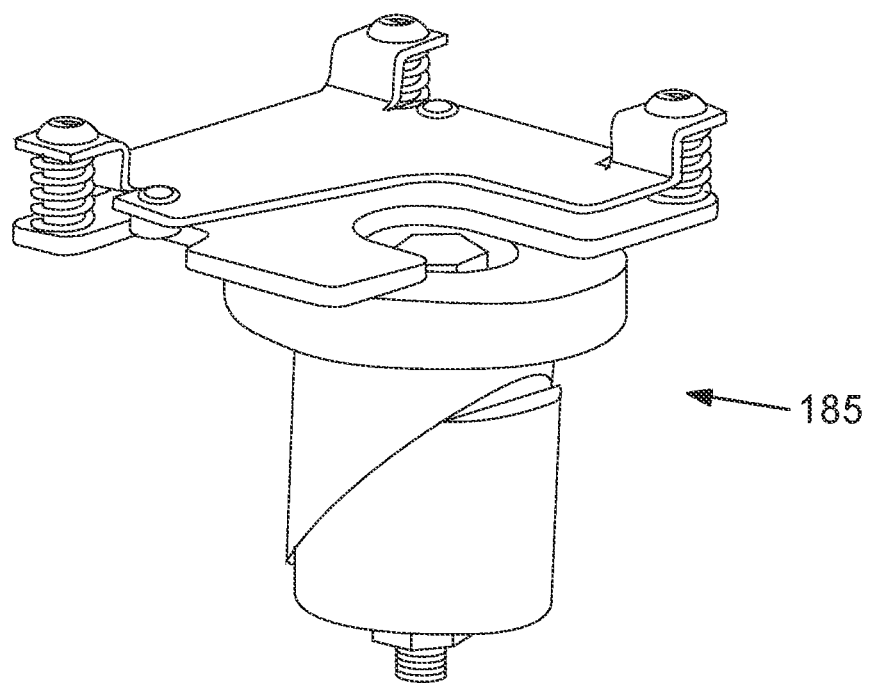
FIG. 11 is a drawing of an embodiment of a bracket adapted to mount a sensor in a tow-pin hole, from a front right perspective.

FIG. 10 is side view of an embodiment of a sensor-mounting recess 180 showing a sensor bracket 185 that is configured to fit into a tow-pin hole 184. An exemplary bracket 185 is illustrated in FIG. 11. The bracket 185 shown has multiple screws at the corners that may be used to level the sensor 188 mounted therein, and is designed to secure the sensor 180 in the tow-pin hole 184 upon adjustment of the nut at the base of the bracket. In the embodiment of the bracket 185 illustrated in FIGS. 10 and 11, tightening the nut will expand the diameter of the portion of the bracket 185 that fits into tow-pin hole 184, to provide a secure fit with no gap. The sensor 188 that is mounted in the sensor recess 180 in FIG. 10 has an unobstructed horizontal line of sight of at least 180 degrees, as the object-detection mechanism is in the upper half of the illustrated conical sensor 188. Alternatively, the sensor 188 may be mounted into sensor-mounting recess 180 using a different type of bracket, such as an L-shaped bracket that is, for example, attached to the lower peripheral edge 268 adjacent to the harness-routing pathway 182, or to an upper or lower surface of the sensor-mounting recess 180.

As shown in FIG. 10, the sensor-mounting recess 180 has a height H and a depth D, and the volume of the sensor 188 lies entirely within the outermost contour of the counterweight 160. The height H of the sensor-mounting recess 180 may be between about 1 inch and about 12 inches, such as, for example, between about 1.5 inches and about 10 inches, between about 2 inches and about 6 inches, or it may be between about 3 inches and about 5 inches. The depth D may be of the sensor-mounting recess 180 may be about 1 inch and about 12 inches, such as, for example, between about 1.5 inches and about 10 inches, between about 2 inches and about 6 inches, or it may be between about 3 inches and about 5 inches.

In an embodiment, the height H and depth D of sensor-mounting recess 180 are independently adapted to accommodate an object-detecting sensor. For example, the height H may be the minimum height needed to mount a sensor 188, or the height H may be the minimum height needed for a sensor to have an unobstructed field of view of at least about 180 degrees. The depth D may be the minimum depth needed to mount the sensor 188, or the depth D may be the depth needed for a sensor to have an optimal focal length or optimal field of view. The size of the sensor-mounting recess 180 may depend upon the size of the sensor 188 that is being mounted, the optimal operating parameters of the sensor 188 (such as focal length or field of view), or both the size and optimal operating parameters of the sensor 188.

Figure 12:
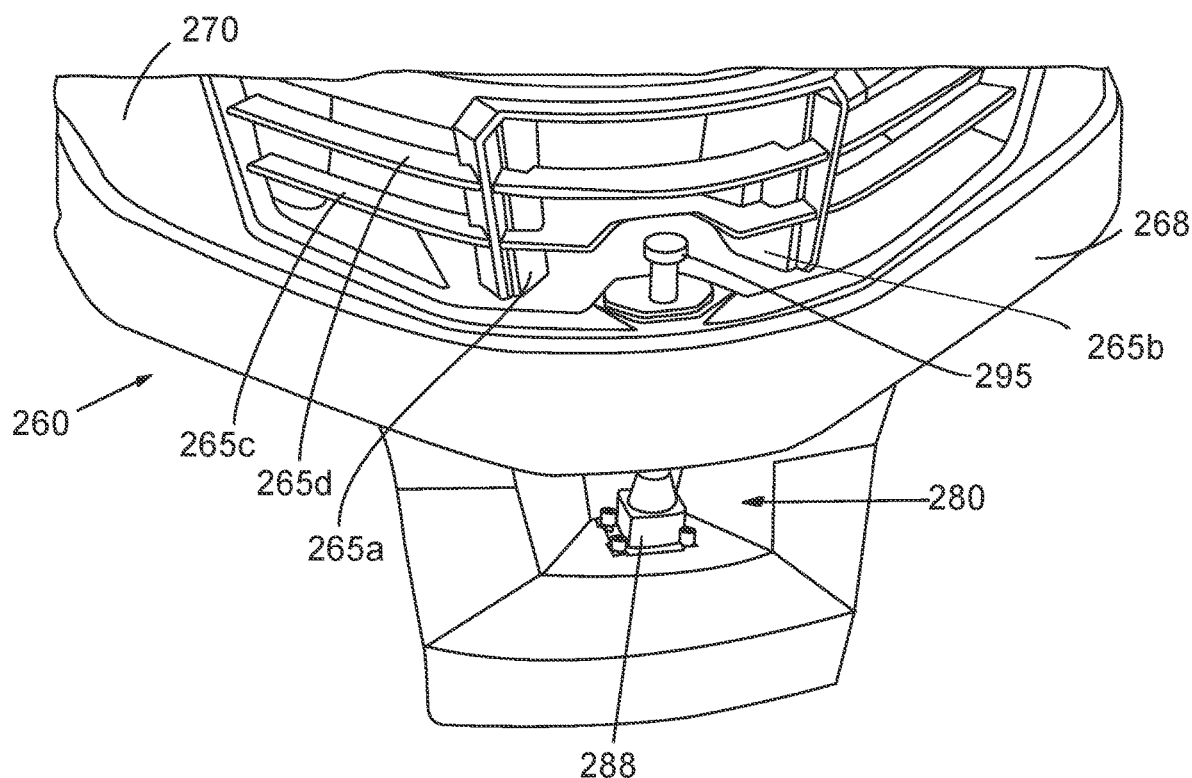
FIG. 12 is an isometric drawing of a counterweight having a sensor-mounting recess with a sensor, from a front right perspective, according to one embodiment.

FIG. 12 shows an embodiment of a counterweight 260 that includes a tow pin 295 that is external to the sensor-mounting recess 280. For example, the lower peripheral edge 268 of the counterweight 260 may include a tow pin 295 extending into the cavity 275 of the frame 270. In an embodiment, the counterweight 260 includes a tow pin 295.

Figure 13:
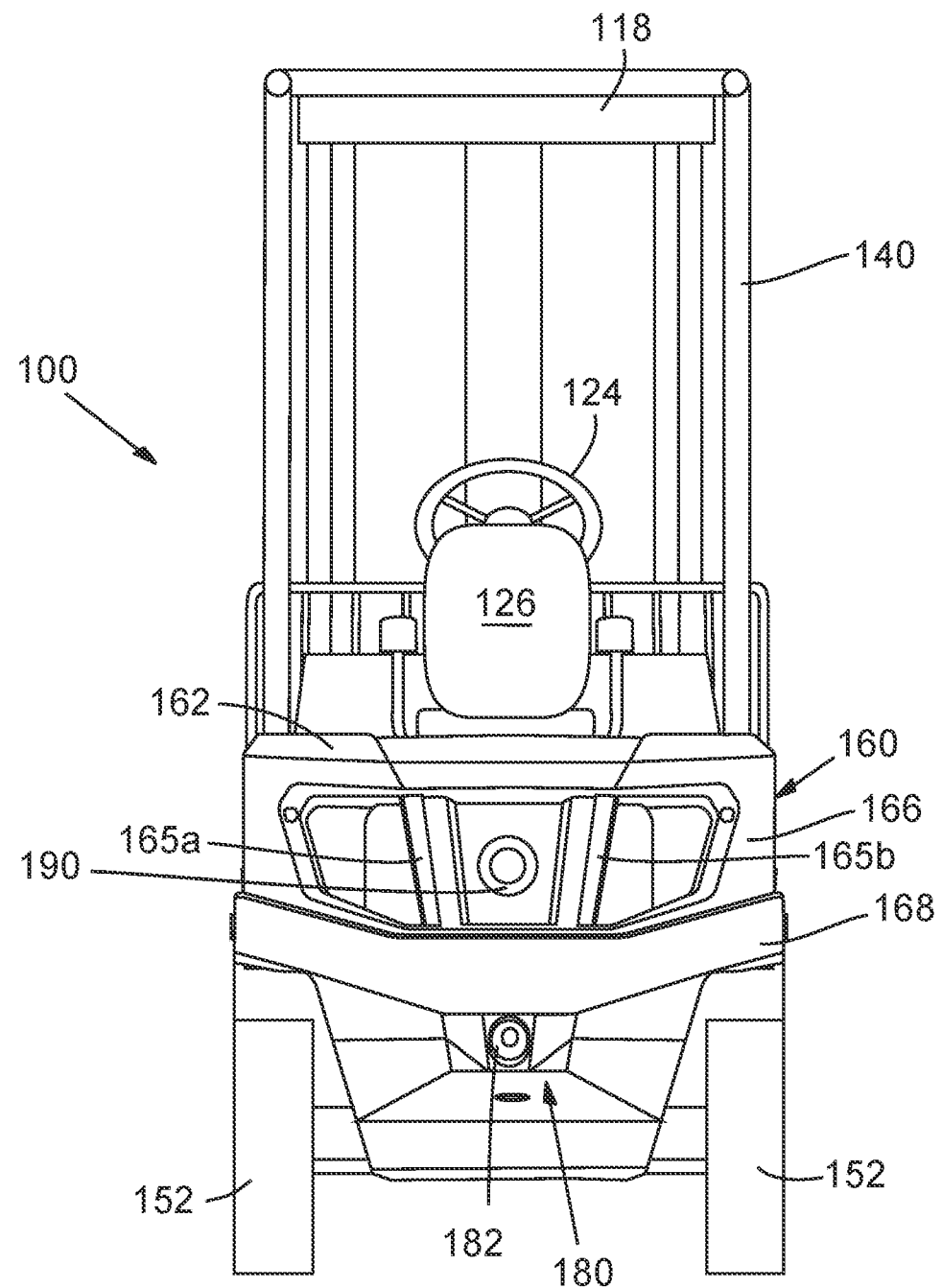
FIG. 13 is a drawing of a lift truck having a counterweight with a sensor-mounting recess, from a rear perspective, according one embodiment.
Figure 14:
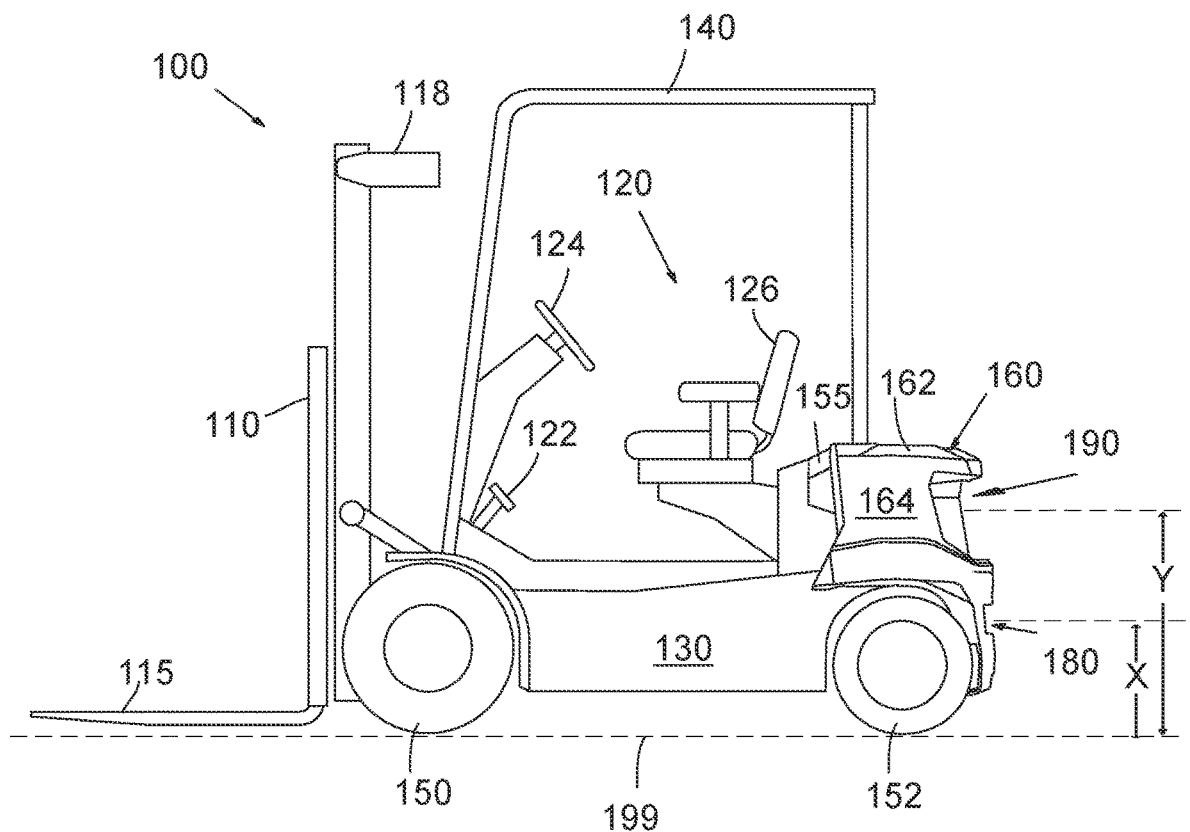
FIG. 14 is a drawing of a lift truck having a counterweight with a sensor-mounting recess, from a side perspective, according one embodiment

With reference to FIGS. 13 and 14, the lift truck 100 incorporates an energy source that provides power to the truck. The energy source turns one or more of a plurality of wheels to propel the truck forward and backward, and may also actuate the lift assembly. The energy source may include a battery or battery bank, an electric motor, an internal combustion engine, a hydrogen fuel cell, or any combination of the foregoing. The energy source used for turning the wheels and propelling the truck may be the same as, or may be different from, the energy source used for the lift assembly. For example, the energy source of the lift truck 100 may include a lithium ion battery or a bank of multiple such batteries for steering and driving, and the lift assembly may be actuated by a hydraulic system powered by an electric motor. In an embodiment, the energy source includes a lead-acid battery. A battery bank of multiple batteries may in some circumstances be considered to be one functional unit that may be referred to herein as simply a "battery." Thus, the term "battery" may mean a single battery or a functional unit comprising multiple batteries, depending on context. In an embodiment, the energy source includes a lithium ion battery. In an embodiment, the energy source includes an internal combustion engine. In an embodiment, the energy source includes one or more of an internal combustion engine, a lithium ion battery, and a lead-acid battery.

Figure 19:
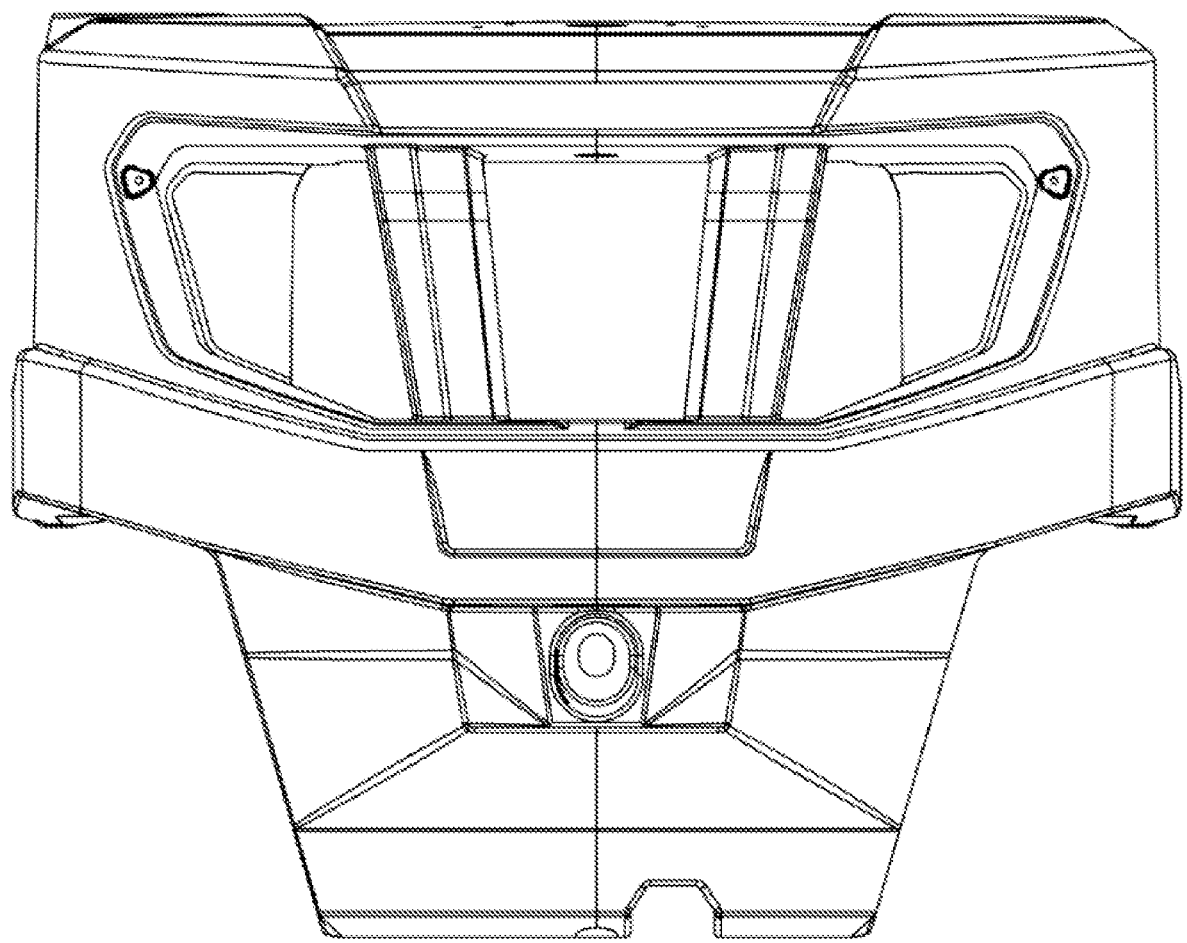
FIG. 19 is a drawing of an embodiment of counterweight having a sensor-mounting recess, from the front.
Figure 20:
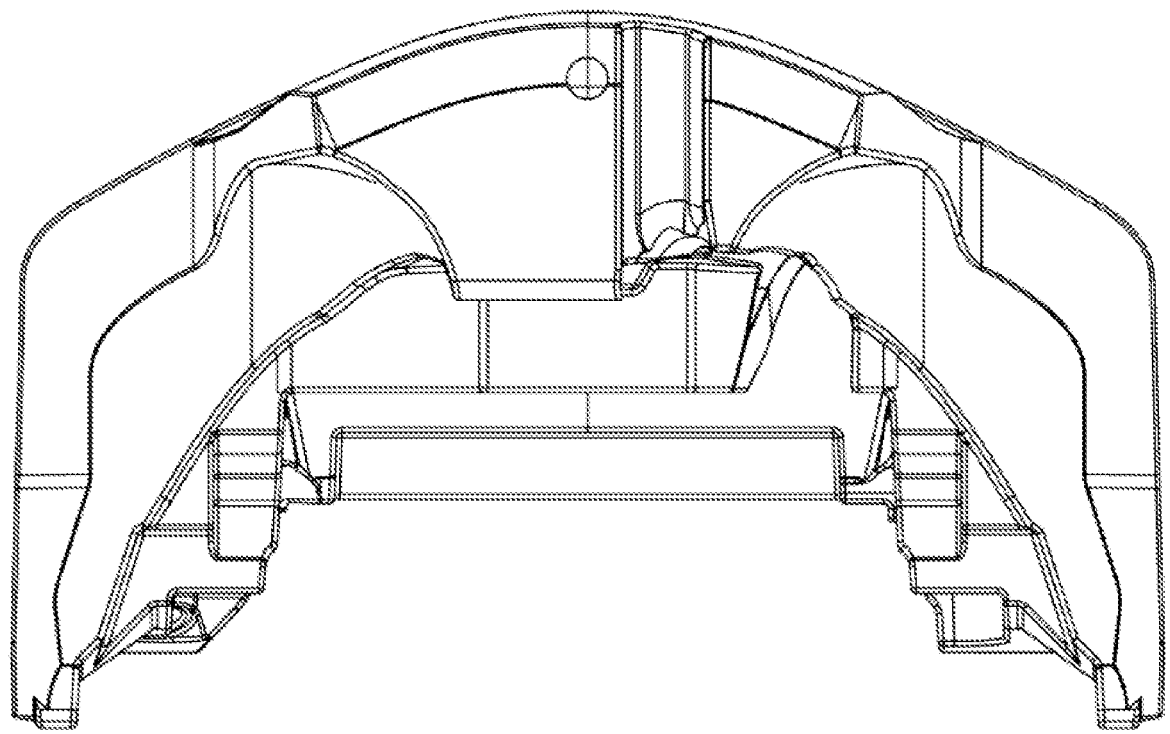
FIG. 20 is a drawing of an embodiment of counterweight having a sensor-mounting recess, from the bottom (underside) of the counterweight.
Figure 21:
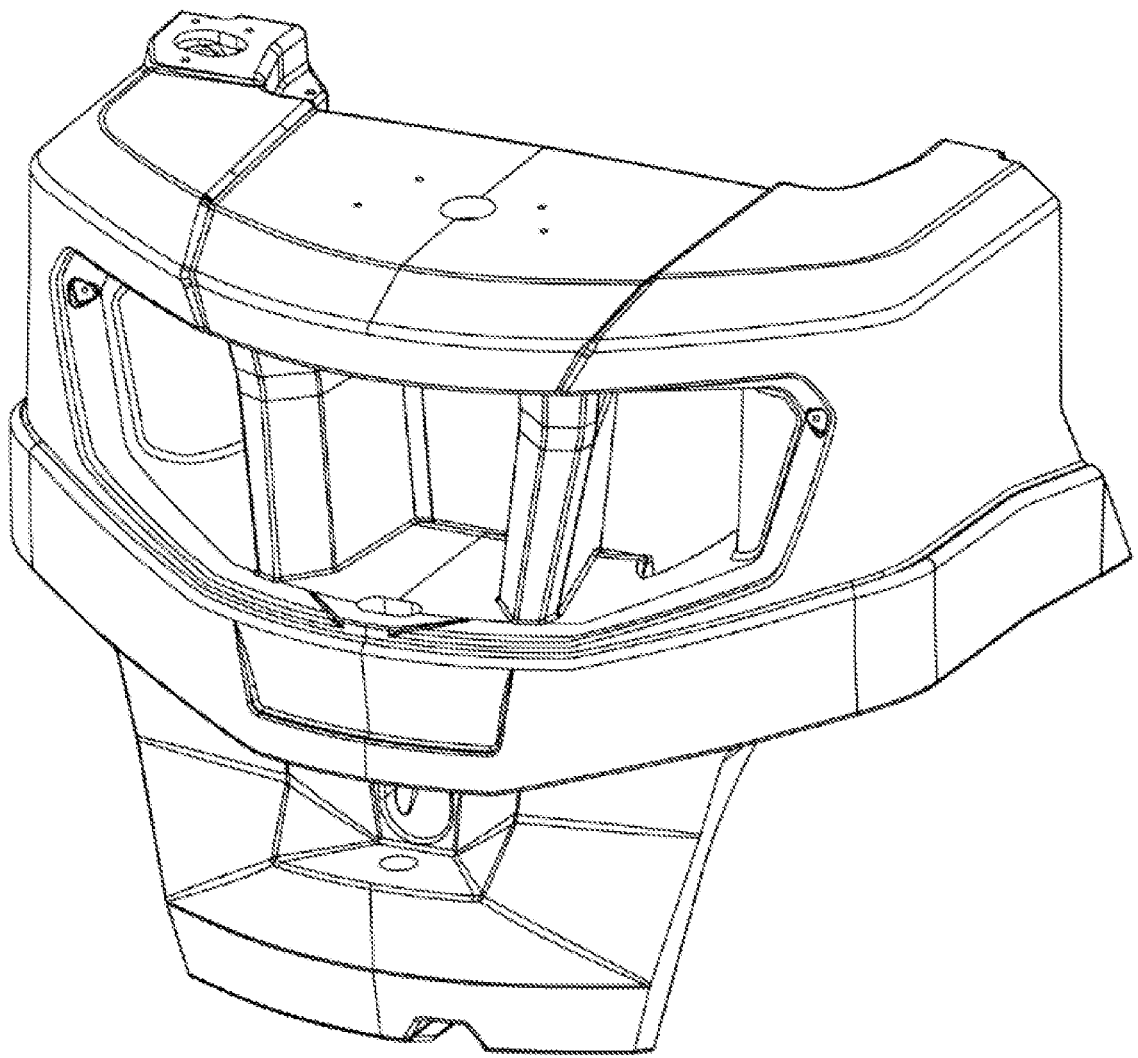
FIG. 21 is an isometric drawing of a counterweight from a front left perspective, according to one embodiment.
Figure 22:
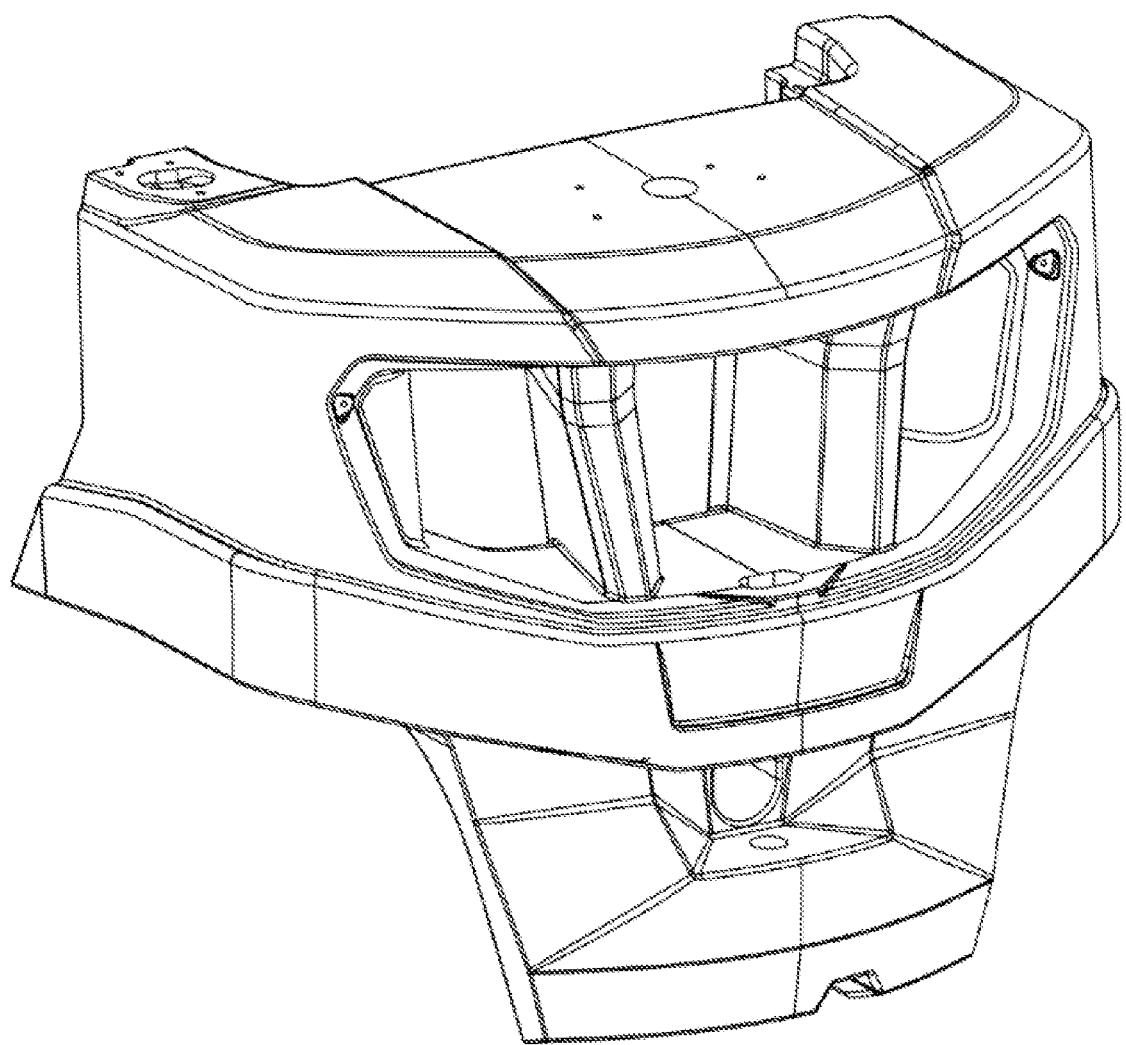
FIG. 22 is an isometric drawing of a counterweight from a front right perspective, according to one embodiment.

With reference to FIGS. 13 and 14, the lift truck 100 may include an energy source that is located behind the seat 126. The energy source may have an exhaust tube having an end 190 that releases exhaust to vent combustion gases and/or heat from an engine or engine compartment, and away from the operator's compartment 120. The exhaust tube end 190 may be placed within the frame 170 of the counterweight 160, such as shown in FIG. 13, and vent exhaust gases and/or heat in a location that is distant and separated from the sensor-mounting recess 180. Such a placement is advantageous in that the vented exhaust gases and/or heat would not adversely affect a sensor 188 that may be located in sensor-mounting recess 180. In an embodiment, the exhaust tube end 190 is positioned external of the sensor-mounting recess 180. For example, the exhaust tube end 190 may be positioned in the cavity 175 of the counterweight 160, or it may be positioned near the overhead guard 140 and vent above the driver. In certain embodiments, the exhaust tube end 190 may be positioned below the lower peripheral edge 168 of the counterweight 160 and vent near the floor, or there may be a small cut-out in lower peripheral edge 168 to allow the exhaust tube end 190 to vent therethrough (see, for example, FIGS. 19, 21, and 22). In an embodiment, the exhaust tube end 190 is positioned external of the counterweight 160. In an embodiment, the exhaust tube end 190 is positioned in, or collinear with, the harness-routing pathway 182 in the sensor-mounting recess 180.

FIG. 14 is a side view of the lift truck 100 depicted in FIG. 13, showing the height of the opening of an exhaust tube having an end 190, where gases and/or heat is released, relative to the position of the sensor-mounting recess 180 and the ground 199. As indicated in FIG. 14, the approximate vertical midpoint of the sensor-mounting recess 180 is located above the ground 199 at a height X and the approximate vertical midpoint of the exhaust tube end 190 is located above the ground 199 at a height Y. The ground 199 is considered to be an approximately planar surface upon which the lift truck lies, and may be a ramp or other raised supporting surface as well as a substantially flat floor, a warehouse aisle, a road, or the like. In certain embodiments of lift trucks 100 depicted by FIG. 14, the height Y is greater than height X. For example, in an embodiment, the height Y is between about 18 inches and about 90 inches, such as between about 24 inches and about 84 inches. The exhaust tube end 190 may be located within the frame 170, such as in the cavity 175 (see, for example, FIG. 13). In an embodiment, the height X is between about 12 inches and about 32 inches, between about 15 inches and about 24 inches, or between about 17 inches and about 19 inches.

Figure 16:
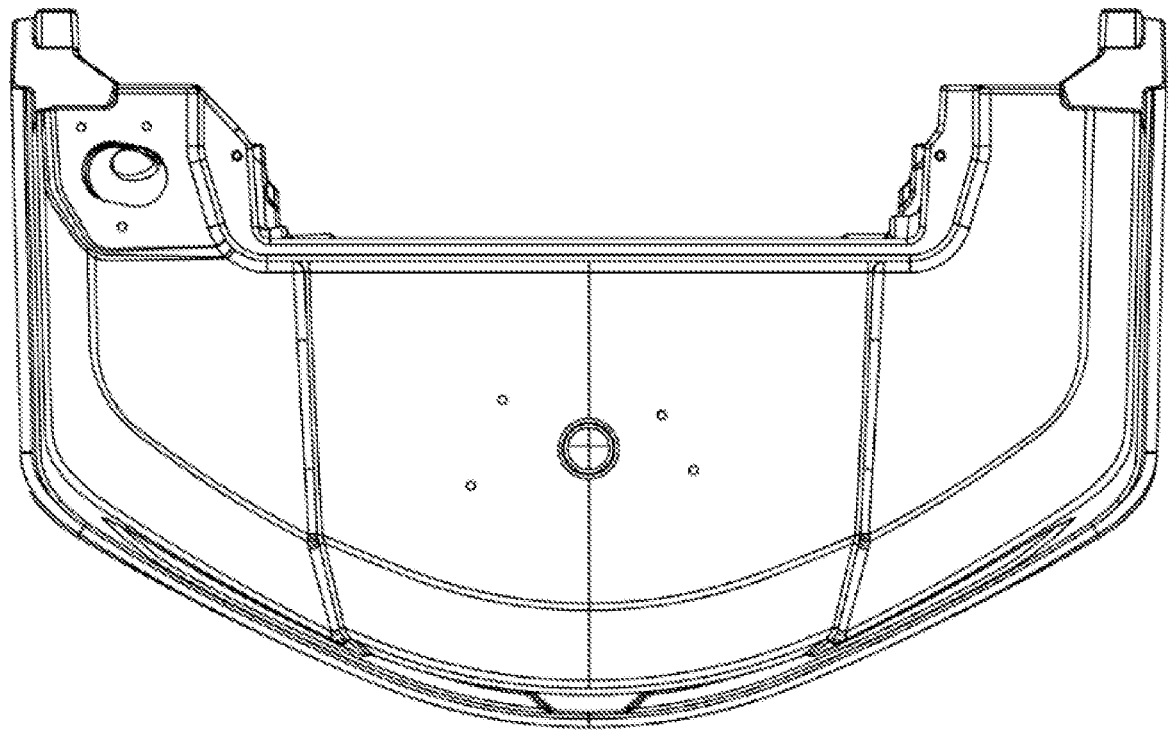
FIG. 16 is a drawing of an embodiment of counterweight having a sensor-mounting recess, from the top.
Figure 17:
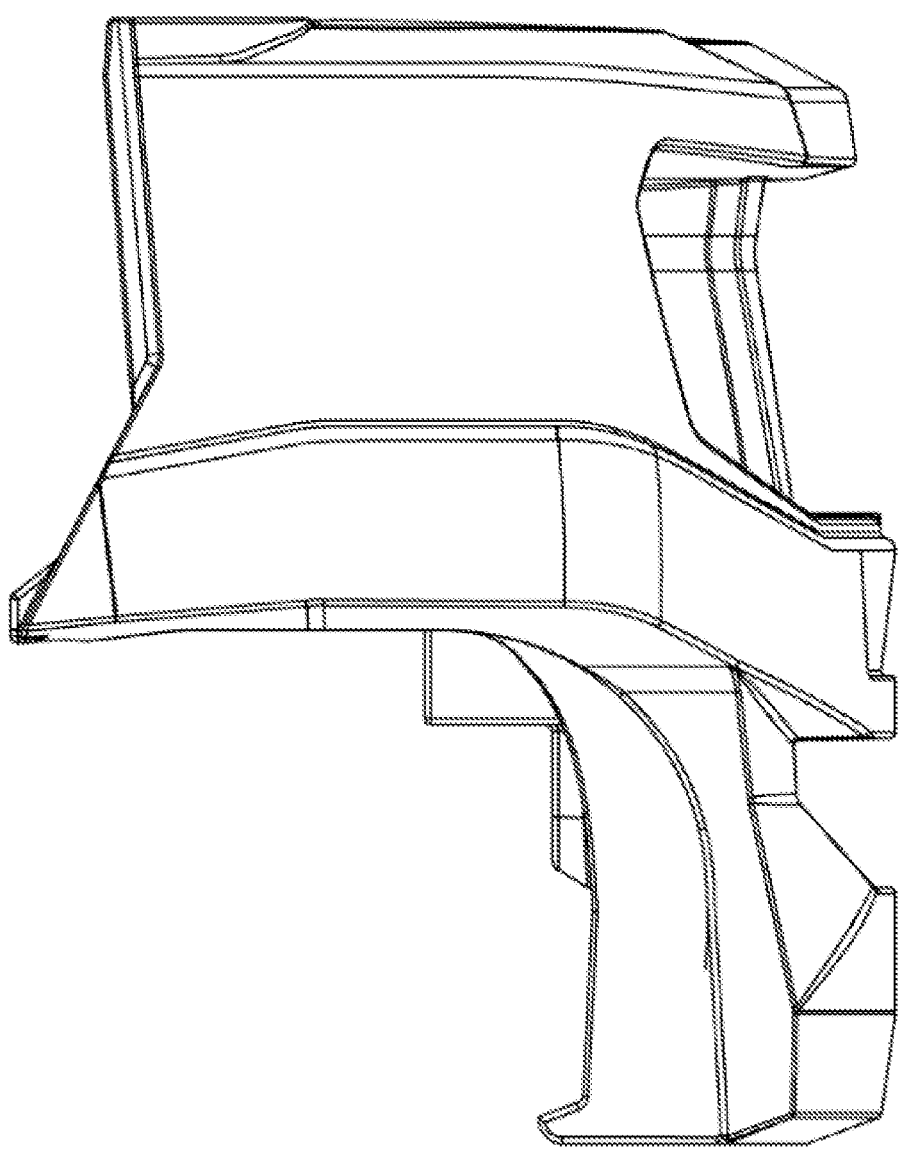
FIG. 17 is a drawing of an embodiment of counterweight having a sensor-mounting recess, from the right side.
Figure 18:
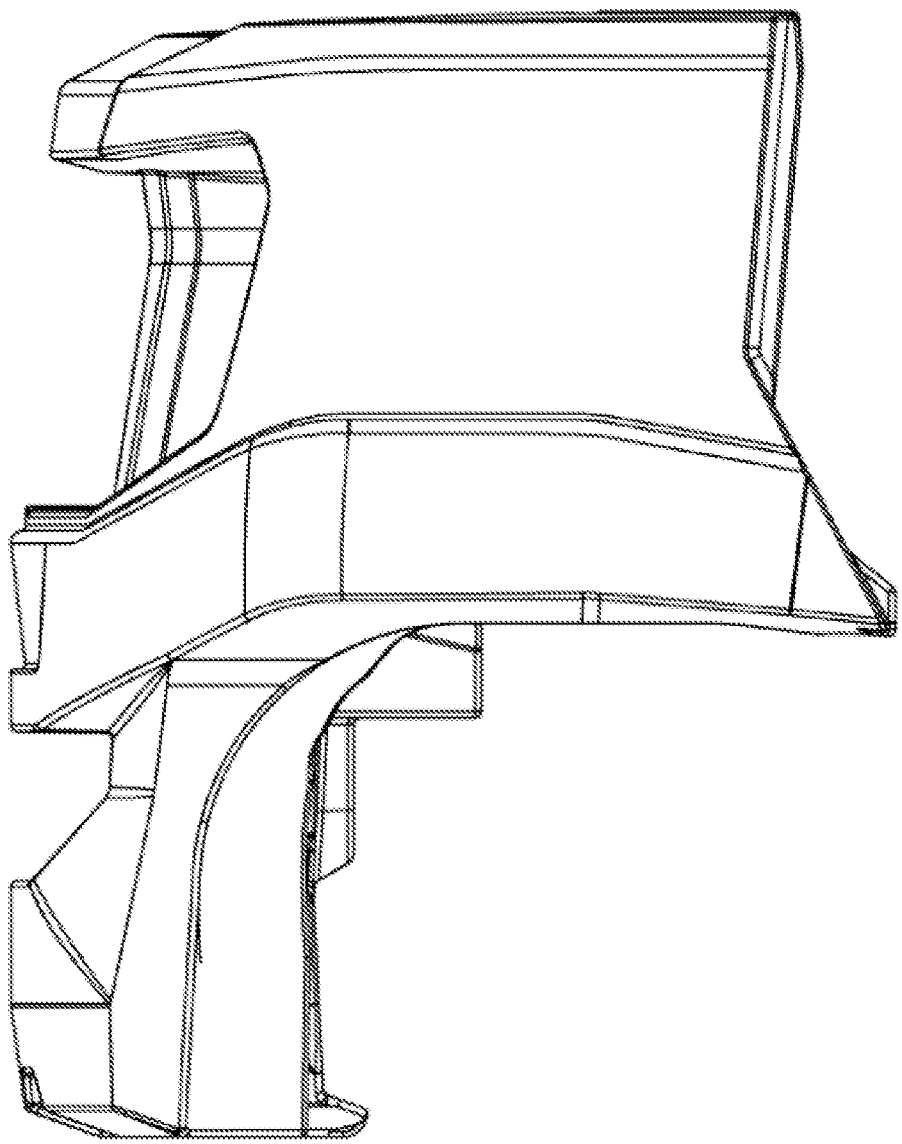
FIG. 18 is a drawing of an embodiment of counterweight having a sensor-mounting recess, from the left side.

In some embodiments, the exhaust tube end 190 may be located above the operator and near the top of the operator's compartment 120, to vent near the overhead guard 140. For example, the exhaust tube end 190 may extend from an exhaust stack pipe that mounts on top of the counterweight (see, for example, FIG. 16, having a hole and mounting for such a pipe in the upper left corner of the drawing). In such embodiments, the height Y may be between about 60 inches and about 180 inches, such as between about 80 inches and about 150 inches.

In an alternate embodiment, the exhaust tube end 190 may be located below the sensor-mounting recess 180, toward the ground 199. For example, the exhaust tube end 190 may be located below the lower peripheral edge 168 of the counterweight 160 and vent near the floor, or lower peripheral edge 168 may be designed to allow the exhaust tube end 190 to vent therethrough (see, for example, FIGS. 19, 21, and 22). In such embodiments, the height Y is less than height X. For example, the height Y may be between about 1 inch and about 16 inches, such as between about 2 inches and about 12 inches.

For purposes of this description, a sensor 188 that is mounted in the sensor-mounting recess 180 of the truck 100, such as an object-detection sensor, includes one or more arrays that are located approximately at, or have an average height approximately of, the horizontal midpoint of the sensor-mounting recess 180. The sensor array may include a transmitter, a receiver, a detection array, an imager, or any combination of the foregoing. Thus, the height X of FIG. 14 may represent the height of the horizontal line of sight of a scanning laser sensor above the ground 199. In an embodiment, the height of the horizontal line of sight of a sensor 188 mounted in sensor-mounting recess 180 is between about 6 and about 48 inches, between about 12 inches and about 36 inches, between about 18 inches and about 32 inches, or between about 20 inches and about 30 inches.

The lift truck 100 may be any type of materials-handling vehicle that includes a counterweight 160. In an embodiment, the lift truck has a lift capacity between about 0.5 ton and about 55 tons, including between about 0.5 ton and about 10 tons, between about 1 ton and about 4 tons, about 1 ton, about 1.5 tons, about 2 tons, about 2.5 tons, about 3 tons, about 3.5 tons, about 4 tons, about 4.5 tons, and about 5 tons.

As described herein, the sensor-mounting recess 180 may provide benefits to materials-handling vehicles that may not include a counterweight 160, or that may include a conventional counterweight without an integrated sensor-mounting recess 180. For example, a materials-handling vehicle may incorporate a component such as a bumper or fender that includes a sensor-mounting recess 180 for mounting a sensor 188. In certain embodiments, the frame 130 component of a materials-handling vehicle may include a sensor-mounting recess 180. The sensor-mounting recess 180 may be located on an end, a side, or the overhead guard or roof (or other overhead component) of a materials-handling vehicle, thereby providing an environment that protects a sensor 188 mounted therein from physical damage while also allowing for optimum or desirable sensor performance. In an embodiment, a materials-handling vehicle includes a component having a sensor-mounting recess.

Figure 15:
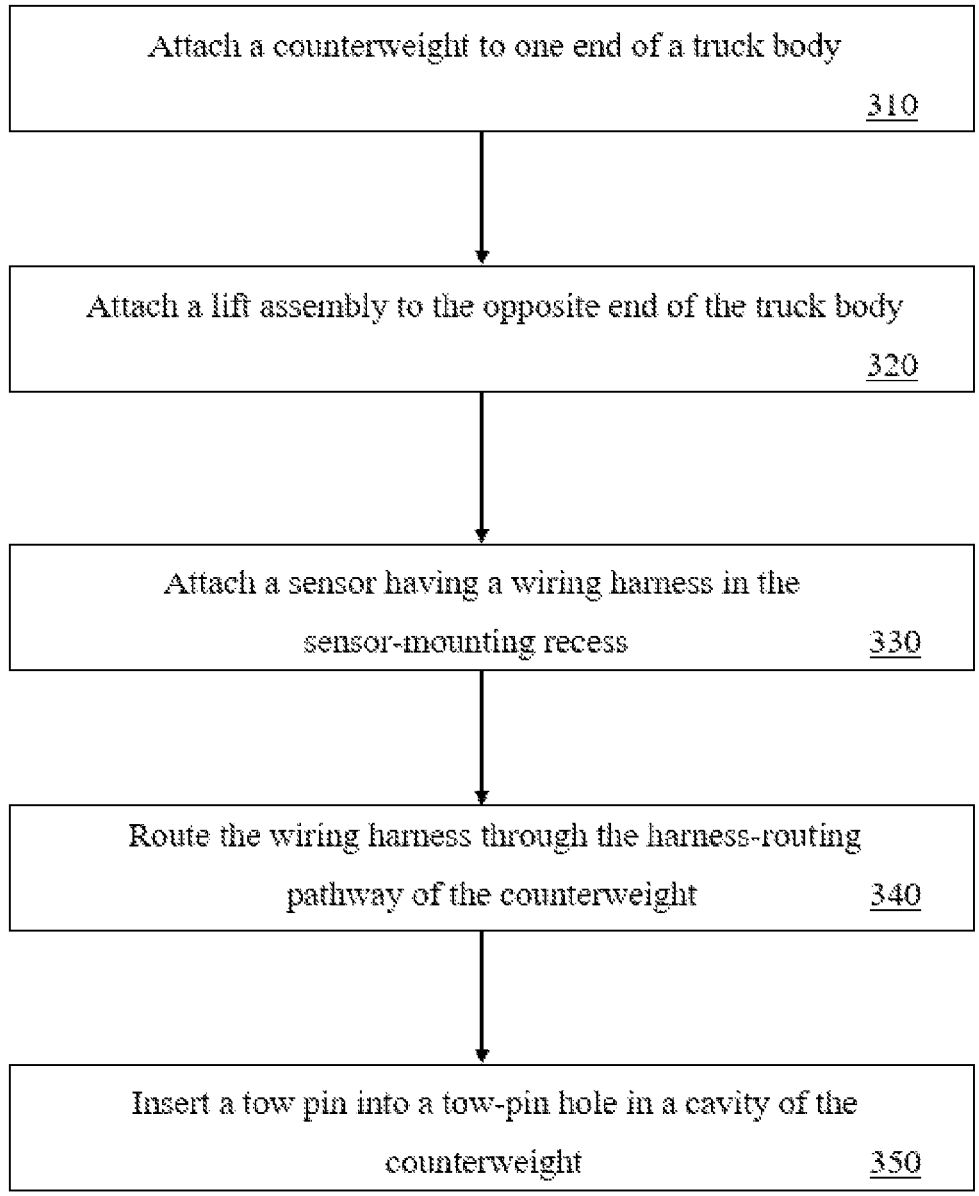
FIG. 15 is a flow chart illustrating an embodiment of a method of assembling a lift truck.

FIG. 15 is a flow chart illustrating a method of assembling a lift truck, according to one example embodiment. For the sake of clarity, this method will be described with reference the lift truck 100 described above as a specific example, but this method is not limited to that specific lift truck and may be practiced with any applicable materials-handling truck. In this embodiment, as illustrated in FIG. 15, the lift truck 100 is assembled, in part, by attaching a counterweight 160 to one end of a truck body 130, per step 310. The counterweight 160 includes a cavity 175, a sensor-mounting recess 180, and a harness-routing pathway 182. The cavity 175 has an opening on the exterior side of the outer surface of the counterweight 160 defined by a frame 170, which is the exterior side of the outer surface of the counterweight 160 other than the opening of the cavity 175.

Per step 320, a lift assembly 110, which may include a pair of forks 115 and a mast 118, is attached to the opposite end of the truck body 130 as the counterweight 160. In an alternative embodiment, the lift truck 100 is assembled by first attaching the lift assembly 110 to the truck body 130, then attaching the counterweight 160 to the opposite end of the truck body 130 as the lift assembly 110. That is, the order of steps 310 and 320 may be reversed. Other steps involved in completely assembling the lift truck 100 are not illustrated in FIG. 15. Such other steps may occur before, after, or between the steps illustrated in FIG. 15.

Next, per step 330, the sensor 188, having or connectable to a wiring harness 189, is attached in the sensor-mounting recess 180. The wires of the wiring harness 189 may transmit power and/or data to and from the sensor 188. Per step 340, the wires of the wiring harness 189 are routed through the harness-routing pathway 182 from the sensor-mounting recess 180 to the opposite side of the counterweight 160. The wires of the wiring harness 189 may be attached to, for example, an energy source and/or a processor located in an engine compartment under the panel 155 of FIG. 2 or elsewhere on or in the lift truck 100.

Optionally, the counterweight 160 comprises a tow-pin hole 184 within the cavity 175, and, per step 350, the method of FIG. 15 includes the step of inserting a tow-pin in the tow-pin hole 184.

In an additional embodiment, the method of assembling a lift truck may include a method of mounting a sensor in the sensor-mounting recess. For the sake of clarity, this method will be described with reference the lift truck 100 described above as a specific example, but this method is not limited to that specific lift truck and may be practiced with any applicable materials-handling truck. A method of mounting a sensor in the sensor-mounting recess may include one or more of the following steps: the step of attaching a bracket 185 to the sensor 188; the step of leveling the sensor 188 by adjustment of screws at the corners of bracket 185; the step of adjusting the bracket 185 to fit snugly in the tow-pin hole 184 by tightening or loosening the bracket bolt to fill the gap between the tow-pin hole 184 and the bracket 185; and the step of inserting bracket 185 into a tow-pin hole 184 within the sensor-mounting recess 180. The bracket 185 may be adapted to fit into a tow-pin hole 184 on the counterweight 160. Various designs of bracket 185 may be desired for attachment to various types of sensors 188 and/or for securing into the sensor-mounting recess 180.

In an embodiment, a counterweight includes a means for mounting a sensor. For example, the counterweight 160 includes a means for mounting the sensor 188. The means for mounting a sensor may include a hole within a recess, wherein the hole accepts a bracket, such as the bracket 185, connected or connectable to the sensor, and wherein the recess is sized and shaped so as to fit the sensor in such a manner that provide an unobstructed horizontal line of sight of at least about 180 degrees for a sensor when the sensor is mounted. The hole may be, for example, a tow-pin hole, and a separate tow-pin may be additionally provided on the counterweight.

The counterweights 160 and 260, including those depicted in FIGS. 1-14 and 16-22, are exemplary embodiments of the counterweights disclosed herein. It is understood that various features of the counterweights 160 and 260 are optional and may be omitted from a counterweight while maintaining one or more of the advantageous features of the disclosed counterweights. For example, the tow pin 295 is optional, as depicted in the embodiment of the counterweight 200 shown in FIG. 12. In addition, the sensor 188 may not need the bracket 185 that is inserted in the tow-pin hole 184 of the sensor-mounting recess 180, as shown in FIG. 10. In an aspect, only the counterweight in FIGS. 1-2 and 13-14 is claimed, but the other components are shown for context and setting and only for illustrative purposes. In a further aspect, the entire lift truck 100 in FIGS. 1-2 and 13-14 is claimed.

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A counterweight for a lift truck, the counterweight comprising:
    a frame formed by a substantially horizontal upper peripheral edge, a first substantially vertical side peripheral edge, a second substantially vertical side peripheral edge opposite the first substantially vertical side peripheral edge, and a lower peripheral edge;
    a cavity surrounded by the frame; and
    a sensor-mounting recess in the lower peripheral edge of the frame,
    wherein the sensor-mounting recess is configured to provide an unobstructed horizontal line of sight of at least about 180 degrees for a sensor mounted within the sensor-mounting recess.

2. A counterweight according to claim 1, wherein the sensor comprises an object-detection sensor.

3. A counterweight according to claim 1, wherein the lower peripheral edge of the frame further comprises a tow-pin hole.

4. A counterweight according to claim 1, wherein the lower peripheral edge of the frame further comprises a harness-routing pathway.

5. A counterweight according to claim 1, wherein the lower peripheral edge of the frame further comprises a tow pin.

6. A counterweight according to claim 1, wherein the lower peripheral edge of the frame has a length between about 20 inches and about 120 inches.

7. A counterweight according to claim 1, wherein the sensor-mounting recess has a height between about 2 inches and about 6 inches.

8. A counterweight according to claim 1, wherein the sensor-mounting recess has a depth of between about 2 inches and about 6 inches.

9. A counterweight according to claim 1, wherein the ratio of the height of the upper peripheral edge to the height of the lower peripheral edge is between about 1:1 and about 1:5.

10. A counterweight according to claim 1, wherein the ratio of the height of the upper peripheral edge to the height of the lower peripheral edge is less than 1.

11. A counterweight according to claim 1, having a mass between about 500 kg and about 2,500 kg.

12. A lift truck comprising:
    a lift assembly comprising a mast and at least two forks;
    an operator compartment comprising truck steering and speed controls;
    a plurality of wheels;
    an energy source;
    a counterweight comprising a frame and a sensor-mounting recess; and
    a sensor;
    wherein the lift assembly and the counterweight are positioned at opposite ends of the lift truck,
    wherein the sensor is positioned within the sensor-mounting recess and has an unobstructed horizontal line of sight of at least about 180 degrees,
    wherein the frame comprises an upper peripheral edge, two substantially vertical side peripheral edges, and a lower peripheral edge opposite the upper peripheral edge, and
    wherein the frame retains the sensor within the sensor-mounting recess such that a housing of the sensor is contained within the outermost contour of the counterweight.

13. A lift truck according to claim 12, wherein the energy source comprises an exhaust tube having an end that releases exhaust, the exhaust tube end positioned external of the sensor-mounting recess.

14. A lift truck according to claim 12, wherein the lift truck has a lift capacity between about 1 ton and about 4 tons.

15. A lift truck according to claim 12, wherein the sensor comprises an object-detection sensor.

16. A lift truck according to claim 15, wherein the object-detection sensor comprises a lidar sensor.

17. A lift truck according to claim 12, wherein the horizontal line of sight of the sensor is positioned between about 20 inches and about 30 inches above floor level when the truck is positioned on an approximately flat floor.

18. A method comprising:
    attaching a counterweight to one end of a materials-handling truck body, wherein the counterweight comprises a sensor-mounting recess and a harness-routing pathway;
    attaching a sensor in the sensor-mounting recess such that the sensor has an unobstructed horizontal line of sight of at least about 180 degrees, wherein the sensor is connectable to a wiring harness; and
    routing the wiring harness through the harness-routing pathway of the counterweight.

19. A method according to claim 18, wherein the method further comprises:
    attaching a bracket to the sensor; and
    securing the bracket in the sensor-mounting recess.

20. A method according to claim 18, wherein the counterweight comprises a cavity having a tow-pin hole therein, and wherein the method further comprises:
    inserting a tow pin in the tow-pin hole.

* * * * *